US005602964A

United States Patent [19]

Barrett

[11] Patent Number: 5,602,964
[45] Date of Patent: Feb. 11, 1997

[54] AUTOMATA NETWORKS AND METHODS FOR OBTAINING OPTIMIZED DYNAMICALLY RECONFIGURABLE COMPUTATIONAL ARCHITECTURES AND CONTROLS

[75] Inventor: Terence W. Barrett, Vienna, Va.

[73] Assignee: Autometric, Incorporated, Alexandria, Va.

[21] Appl. No.: 65,159

[22] Filed: May 21, 1993

[51] Int. Cl.⁶ .................................................. G06F 15/18
[52] U.S. Cl. .................................................. 395/24; 395/23
[58] Field of Search .................................................. 395/24, 23

[56] References Cited

U.S. PATENT DOCUMENTS

| | | | |
|---|---|---|---|
| 4,195,337 | 3/1980 | Bertrand et al. | 364/151 |
| 4,926,180 | 5/1990 | Anastassiou | 395/27 |
| 5,016,188 | 5/1991 | Lan | 395/24 |
| 5,073,962 | 12/1991 | Calitano | 382/27 |

OTHER PUBLICATIONS

Local Controllability and Motion Planning For Some Classes of Systems with Drift Proceedings of the 30th Conference on Decision and Control—IEEE Dec. 1991.

*Primary Examiner*—Ayaz R. Sheikh
*Assistant Examiner*—Richemond Dorvil
*Attorney, Agent, or Firm*—Jim Zegeer, Esq.

[57] ABSTRACT

A system for obtaining optimum performance and optimum graceful degradation from Lie algebra descriptions of a spectrum of reconfigurable network architectures, including, neural nets and cellular automata comprised of interconnected nodes. The dynamic performance of the computational process is monitored by continued extraction of Liapounov exponent indicators, reconfiguring said reconfigurable network architecture when said indicators predict non-optimum performance. The reconfigurable networks are reconfigured and compensatory adjustments are made of signal sampling performance and operating system performance of said reconfigurable network architecture, and the operating system architecture is optimized to the computational task by reconfiguration of nodal capabilities and degree of interconnectedness between nodes to obtain any Lie algebra description architectural form between ideal neural net with maximum interconnectedness and ideal cellular automata with maximum nodal capability.

8 Claims, 22 Drawing Sheets

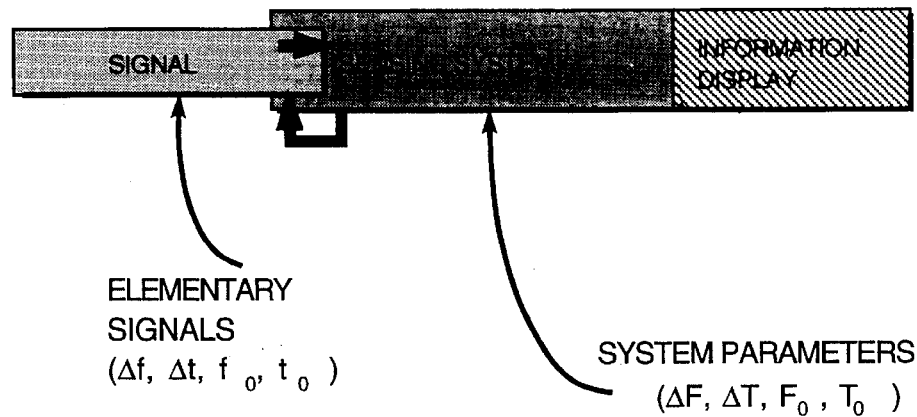

ELEMENTARY
SIGNALS
($\Delta f$, $\Delta t$, $f_0$, $t_0$)

SYSTEM PARAMETERS
($\Delta F$, $\Delta T$, $F_0$, $T_0$)

FIG. 1

1. CHARGE UP AND DUMP TIME:

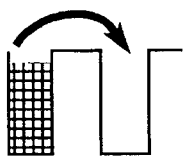

2. SCAN ACROSS DISCRIMINATED DIFFERENCES

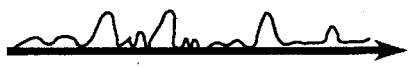

3. DWELL TIME ON PIXEL AT WHICH THERE IS DISCRIMINATED STRUCTURE

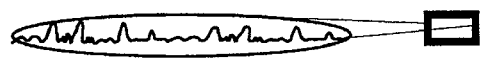

ETC.

FIG. 2

(1) FOR CONSTANT BANDWIDTH:
INCREASE

EITHER (2) FOR VARIABLE BANDWIDTH:
INCREASE $$\Delta T = \frac{\alpha}{2\pi} \frac{Q}{F_0}$$

A DECREASE IN DUMP/DWELL/SCAN TIME RESULTS IN EITHER (1) OR (2)

FIG. 3

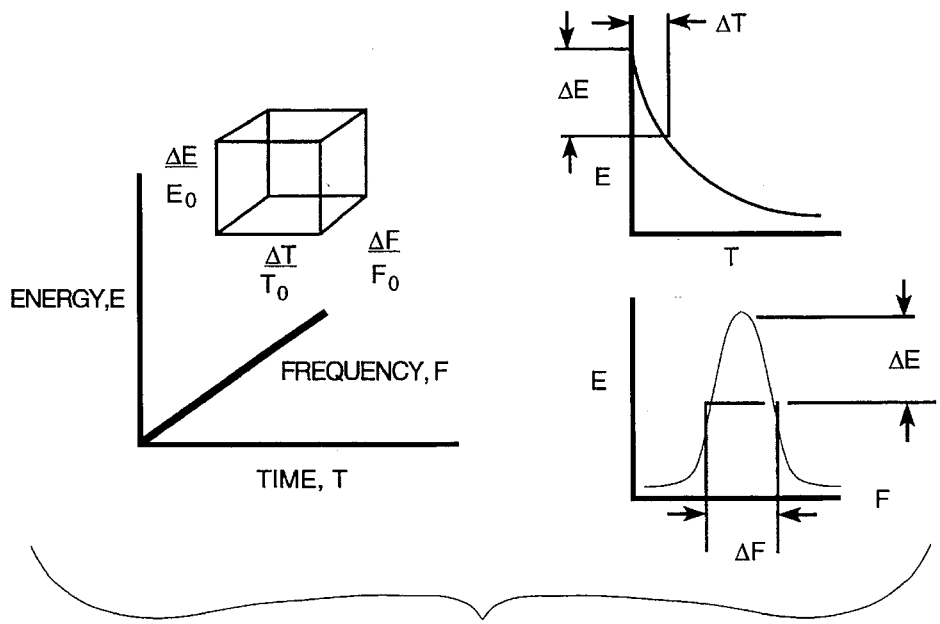

FIG. 4

$\Delta f \Delta t + \Delta F \Delta T = \text{constant} = c + C = 0.5(2n+1) + 0.5(2N+1), N = 0,1,2,3.....$ $\Delta f \Delta t = f_0 t_0 = 0.5(2n+1), n = 0,1,2,3.....$
$\Delta F \Delta T = F_0 T_0 = 0.5(2N+1), N = 0,1,2,3.....$ $\Delta E/E_0 \ \Delta f/f_0 \ \Delta t/t_0 = \text{constant} = \Delta E/E_0$
$\Delta E/E_0 \ \Delta F/F_0 \ \Delta T/T_0 = \text{constant} = \Delta E/E_0$ $\Delta E/E_0 \ \Delta E/E_0 = \text{constant} = \Delta E/E_0$ $(\Delta E/E_0 \ \Delta f/f_0 \ \Delta t/t_0)(\Delta E/E_0 \ \Delta F/F_0 \ \Delta T/T_0) \ \text{constant} = \Delta E/E_0$ $$(\Delta E/E_0 \ \underbrace{\Delta f/f_0 \ \Delta t/t_0}_{3}^{4} )(\Delta E/E_0 \ \underbrace{\Delta F/F_0 \ \Delta T/T_0}_{1}^{2} ) = \text{constant} = \Delta E/E_0$$

FIG. 8

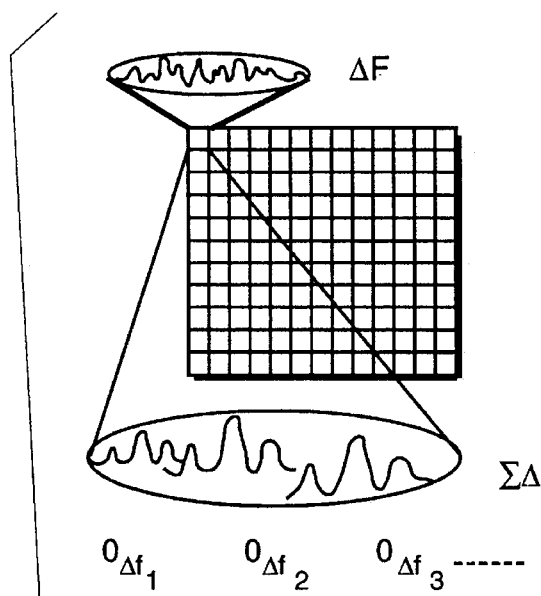
ΔF is constant
ΔT is dwell time/pixel
N = 10
ΔF.ΔT = (1/2)(2N + 1)
ΔF.ΔT = 21/2
n = 0
Δf.Δt = 1/2
ΔT = C
ΔF.ΔT + Δf.Δt = 11
$\sum \Delta f_i = \Delta f$
$^0\Delta f_1 \quad ^0\Delta f_2 \quad ^0\Delta f_3$ ------
FIG. 5A
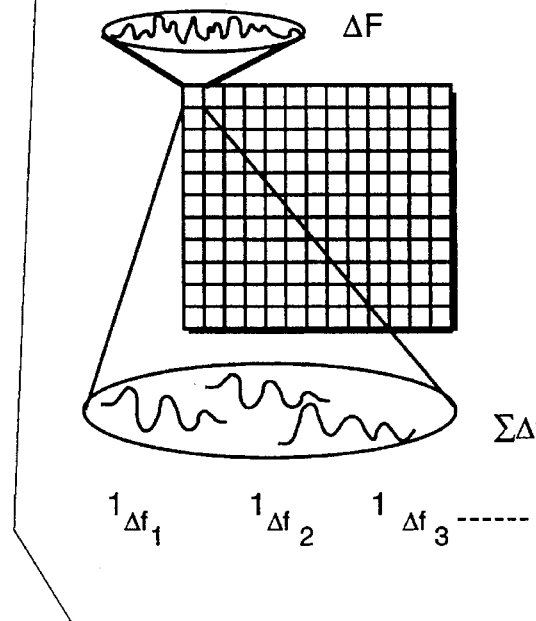
ΔF is constant
ΔT is dwell time/pixel
* N = 9
ΔF.Δ.T = (1/2)(2N + 1)
* ΔF.ΔT = 19/2
* n = 1
* Δf.Δt = 3/2
* ΔT = 19/21C
ΔF.ΔT + Δf.Δt = 11
$\sum \Delta f_i = \Delta f$
$^1\Delta f_1 \quad ^1\Delta f_2 \quad ^1\Delta f_3$ ------

$\Delta f . \Delta t = f_0 t_0 = (1/2)(2n+1)$, $n = 0,1,2,3,\ldots n$ $\Delta f = \Delta x$ $\Delta f.\Delta t = 1/2(2n+1), n = 0,1,2,\ldots n$

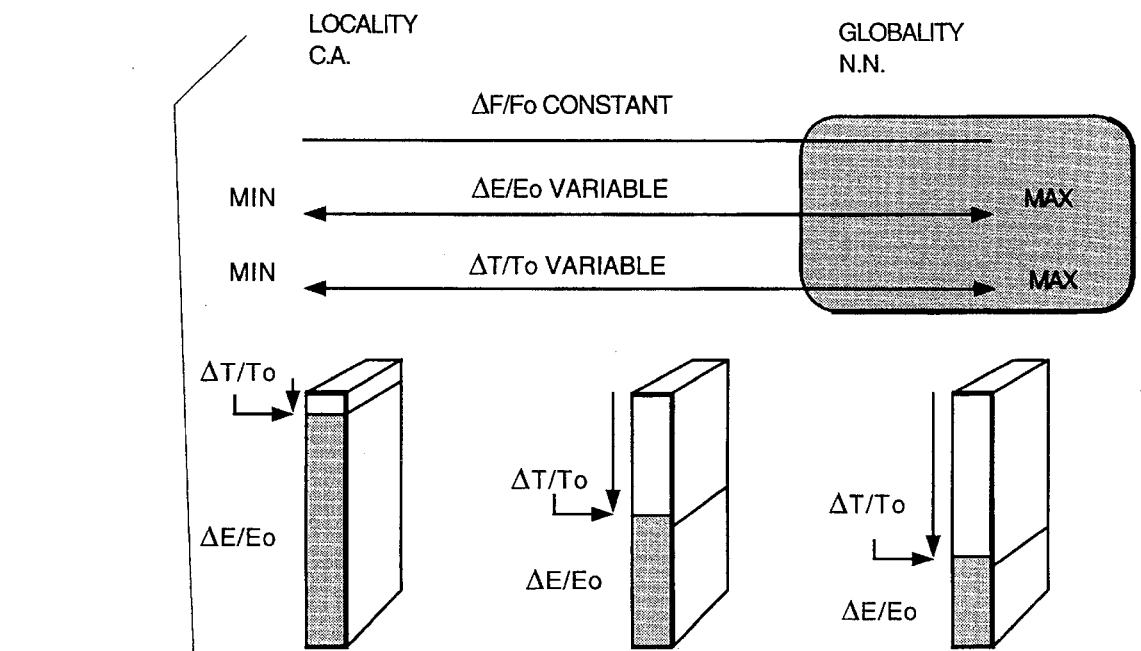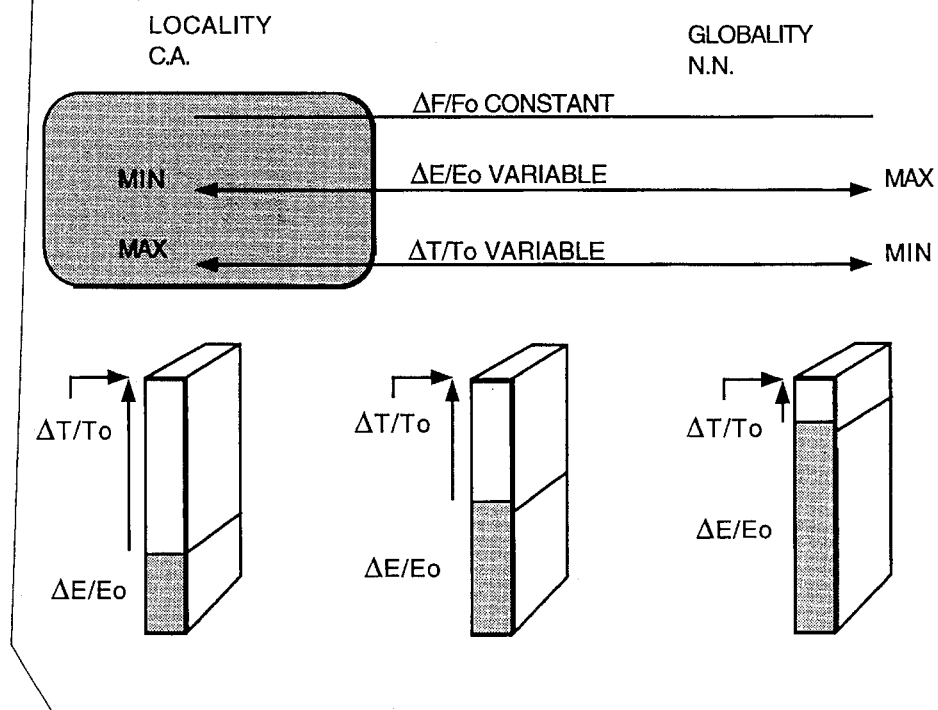
FIG. 19

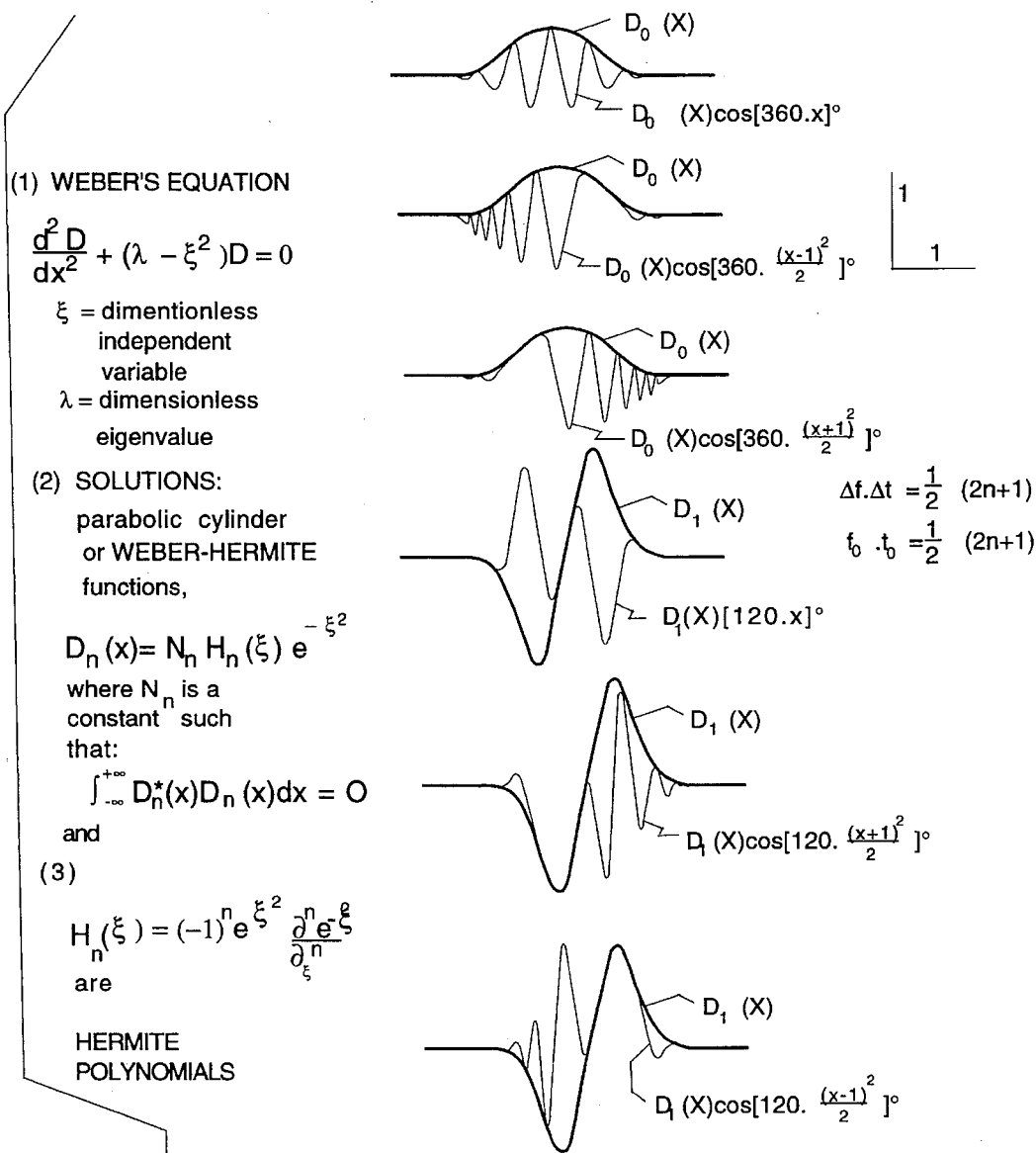

FIG. 25A

Elementary signals with amplitude modulations $D_0(x)$ and $D_1(X)$. In the first of each three, the modulated signal is a sinusoidal function; in the second and third, the amplitude modulated signal is also frequency modulated - either ascending or descending. The frequency modulation is such that $\Delta f.f = 1/2(2n+1)$, where $\Delta f$ is change in frequency and $f_0$ is center frequency.

Elementary signals with amplitude modulations $D_2(x)$ and $D_3(x)$

Elementary signals with amplitude modulation $D_4(X)$

Elementary signals with amplitude modulation $D_5(X)$

AUTOMATA NETWORKS AND METHODS FOR OBTAINING OPTIMIZED DYNAMICALLY RECONFIGURABLE COMPUTATIONAL ARCHITECTURES AND CONTROLS

BACKGROUND OF THE INVENTION

The present invention, relates generally to computer network architectures the operation of which encompasses the neural net and cellular automata architectures as limiting cases; and is based on a synthesis of (a) sampling theory; (b) statistical mechanics: (c) control theory; and (d) algebraic topology. The invention provides knowledge and control of time-to-closure or completion of a computational task; provides knowledge of architecture optimized to task; provides adaptive control in sensing; provides "zoom lens" sensing back-and-forth between high and low resolution; provides "elastic control engineering" for systems in environments of changing demands; provides control for preventing clutter noise affecting object classification; can optimize the capability of any multidimensional system: can categorize the dynamic of any neural net or cellular architecture now available; provides optimum graceful degradation; provides flexible and optimum engineering; provides dynamic architectural reconfigurability; obviates chaos; optimum system performance-sensing trading.

More particularly, the present invention provides flexible and adaptive engineering of network architectures; optimized graceful degradation of various and diverse systems; network architectures optimized to task; forward prediction of systems and architectures obviating chaotic behavior; optimum computational performance under time-to-closure constraints; and optimum system performance-sensing trading.

OBJECTS OF THE INVENTION

Prior art in neural act and cellular automata architectures does not predict time to closure of a computation; does not optimize network architectures to the task to be performed; does not provide a method of control for network architectures which possess the inherent characteristic of containing the dynamic of chaos (path to a strange attractor); does not provide adaptive control in sensing; does not prevent clutter noise from affecting object classification. It is an object of the present invention to provide methods for obtaining such prediction, optimization and control.

It is a further object of the present invention to encompass the functioning of all network architectures and especially the neural net and cellular automata architectures as limiting cases, and to provide a general unification of network architectural types based on a synthesis of (a) sampling theory; (ii) statistical mechanics; (c) control theory; and (d) algebraic topology.

It is a further object of the invention to provide methods for obtaining knowledge and control of time-to-closure or completion of a computational task; for obtaining knowledge of architecture optimized to task; for optimizing the capability of any multidimensional system: for providing adaptive control in sensing; for providing "elastic control engineering"; for "zoom lens" sensing; for categorizing the dynamic of any neural net or cellular architecture now available; for obtaining optimum system graceful degradation; for providing flexible and optimum engineering; for providing dynamic architectural reconfigurability; for preventing chaotic behavior; and for obtaining optimum system performance-sensing trading.

SUMMARY OF THE INVENTION

The present invention addresses a computational network architecture/system defined as a n-dimensional manifold, U, evolving in phase space, and defined as an indication limit, or figure-of-merit:

$$U = \Delta F/F_0 . \Delta T/T_0 . \Delta E/E_0$$

where
- $\Delta F/F$=architectural bandwidth (number of classes or dimensionality of system);
- $\Delta T/T_0$=time to closure;
- $\Delta E/E_0$=interconnectivity (local-to-global).

The evolution of the system in both the recursive training mode and the recursive operation mode is described by:

$$dU = dU_0 \exp[\lambda_i(t-t_0)],$$

where
- $\lambda_1$ is the deviation of nearby trajectories from $V_0$;
- $\lambda_1 + \lambda_2$ is the rate of growth of surface elements;
- $\lambda_1 + \lambda_2 + \lambda_3$ is the rate of growth of three volume elements.

The present invention provides a method of monitoring changes on the topological surfaces of the evolving phase space representation of automata networks in order to obtain the defined goals of finite computational tinning, optimized performance and prevention of behavior limiting a computational result.

The present invention addresses software and hardware embodiments of a universal theory of automata networks composed of both ideal forms and also hybrid forms of neural net (NN) and cellular automata (CA) network architectures in iterative recursive applications. The automata network composite architecture is flexible, adaptive and optimized to task, utilizing reconfigurability and exhibiting autonomy and adaptation so that the functions of detection, discrimination (neural net-like behavior), and tracking, assessment and prediction (cellular automata-like behavior) are optimally performed.

As the architecture is flexible and reconfigurable, the architectural adaptation can result in an ideal neural net-like, an ideal cellular automata-like architecture, or any hybrid or combination of architectures of the two forms, depending on the task to be performed. The present invention obviates the most critical faults of prior art neural net and cellular automata architectures, namely: (i) the time to closure (processing time) is not predictable for recursive operation; (ii) architectures are not optimized to task; (iii) under certain weightings or loadings, recursive architectures become chaotic and never reach closure, whether in the training or operating mode of functioning.

The invention is an iterative (recursive) algorithmic adaptation of any architecture or system.

BRIEF DESCRIPTION OF THE DRAWINGS

FIG. 1. sets the format of the discussion with respect to the present invention. Signals are defined over the four signal parameters: $\Delta f$, $\Delta t$, $f_0$ and $t_0$, such that $\Delta f \Delta t = f_0 t_0 = (\frac{1}{2})(2n+1)$, $n=0,1,2\ldots$, where n is the signal level (cf FIG. 25). The system is defined over the four signal parameters, $\Delta F$, $\Delta T$, $F_0$ and $T_0$, such that $\Delta F \Delta T = F_0 T_0 = (\frac{1}{2})(2N+1)$, $N=0, 1, 2 \ldots$ FIG. 2. The present invention encompasses a set of principles and is completely general and therefore the system parameters can find many and diverse embodiments. Referred to here are various embodiments of systems producing a response time, $\Delta T$, and which may be called by different names depending on the embodiment.

FIG. 3. Simplified description of the system. To the requirement that the system respond more quickly, e.g., to the requirement for a decrease in dump/dwell/scan time, the system can respond according to principles of the invention either by (1) an increase in a which results in an increase in $\Delta E/E_0$ and an increase in $(\Delta f/f_0)(\Delta t/t_0)$ or (2) and increase in bandwidth. (1) is the preferred response in most embodiments. (See also FIG. 8.)

FIG. 4. A summary of the dynamic conditions for the constant relation: $(\Delta E/E_0)(\Delta F/F_0)(\Delta T/T_0)$=a constant.

FIGS. 5A and 5B. illustrate an example of adaptive control in sensing by use of elementary signals. The system is defined by: $\Delta F \Delta T = F_0 T_0 = (\frac{1}{2})(2N+1)$, N=0,1,2 ... The sampled signals by $\Delta f \Delta t = f_0 t_0 = (\frac{1}{2})(2n+1)$, n=0,1,2, ... ,and N+n=a constant. An array of pixels are shown in which a scanner can dwell a finite time, $\Delta T$, in order to receive a data input with bandwidth $\Delta F$. That data input is then sampled resulting in the "gray scale" of that pixel: $\Sigma \Delta f_i = \Delta F$. The example demonstrates changes in gray scale, or pixel information, as the dwell time, $\Delta T$, is shortened, compensating for the increase in speed. $\Delta F \Delta T$ changes from $10.5 \to 9.5 \to 8.5 \to 7.5 \to$, etc., $\Delta f \Delta t$ changes from $0.5 \to 1.5 \to 2.5 \to 3.5 \to$, etc. If $\Delta T$ is some constant, initially, then $\Delta T$ changes from C→0.905 C→0.800 C→0.714 C→, etc.

A, $\Delta F \Delta T$=10.5 (N=10); $\Delta f \Delta t$=0.5 (n=0); N+n=11.0; and the dwell time, $\Delta T$=some constant C.

B, $\Delta F \Delta T$=9.5 (N=9); $\Delta f \Delta t$=1.5 (n=1); N+n=11.0; and the dwell time, $\Delta T$=0.905 C.

C, $\Delta F \Delta T$=8.5 (N=8); $\Delta f \Delta t$=2.5 (n=2); N+n=11.0; and the dwell time, $\Delta T$=0.800 C.

D, $\Delta F \Delta T$=7.5 (N=7); $\Delta f \Delta t$=3.5 (n=3); N+n=11.0; and the dwell time, $\Delta T$=0.714 C. etc.

Figure 6:
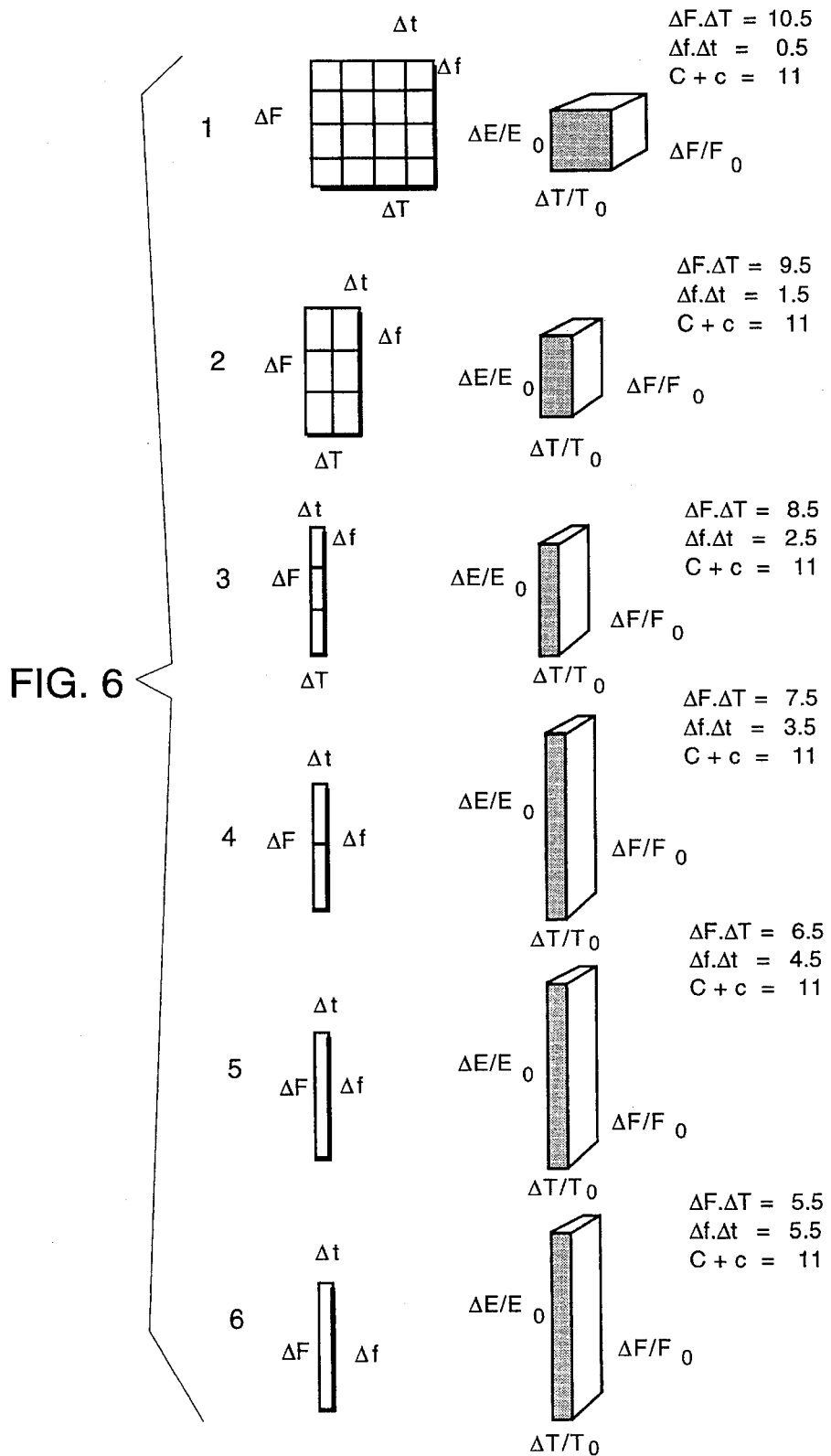

FIG. 6 illustrates an example of adaptive control in sensing by use of elementary signals. The system is defined by: $\Delta F \Delta T = F_0 T_0 = (\frac{1}{2})(2N+1)$, N=0,1,2, ... The sampled signals by $\Delta f \Delta t = f_0 t_0 = (\frac{1}{2})(2n+1)$, n=0,1,2, ..., and N+n=a constant. One pixel is shown in which a scanner dwells for a finite time, $\Delta T$, in order to receive a data input with bandwidth $\Delta F$. That data input is then sampled resulting in the "gray scale" of that pixel: $\Sigma \Delta f_1 = \Delta F$. The example demonstrates changes in gray scale, or pixel information, as the dwell time, $\Delta T$, is shortened, compensating for the increase in speed.

1, $\Delta F \Delta T$=10.5 (N=10); $\Delta f \Delta t$=0.5 (n=0); N+n=11.0; and the gray scale has 16 bits.

2, $\Delta F \Delta T$=9.5 (N=9); $\Delta f \Delta t$=1.5 (n=1); N+n=11.0; and the gray scale has 6 bits.

3, $\Delta F \Delta T$=8.5 (N=8); $\Delta f \Delta t$=2.5 (n=2); N+n=11.0; and the gray scale has 3 bits.

4, $\Delta F \Delta T$=7.5 (N=7); $\Delta f \Delta t$=3.5 (n=3); N+n=11.0; and the gray scale has 2 bits.

5, $\Delta F \Delta T$=6.5 (N=7); $\Delta f \Delta t$=4.5 (n=3); N+n=11.0; and the gray scale has 1 bit.

6, $\Delta F \Delta T$=5.5 (N=7); $\Delta f \Delta t$=5.5 (n=3); N+n=11.0; and the gray scale has 1 bit.

Notice that for example 6, the system product, $\Delta F \Delta T$, and the signal product, $\Delta f \Delta t$, are equilibrated at 5.5 and the gray scale has only 1 bit of information.

Figure 7:
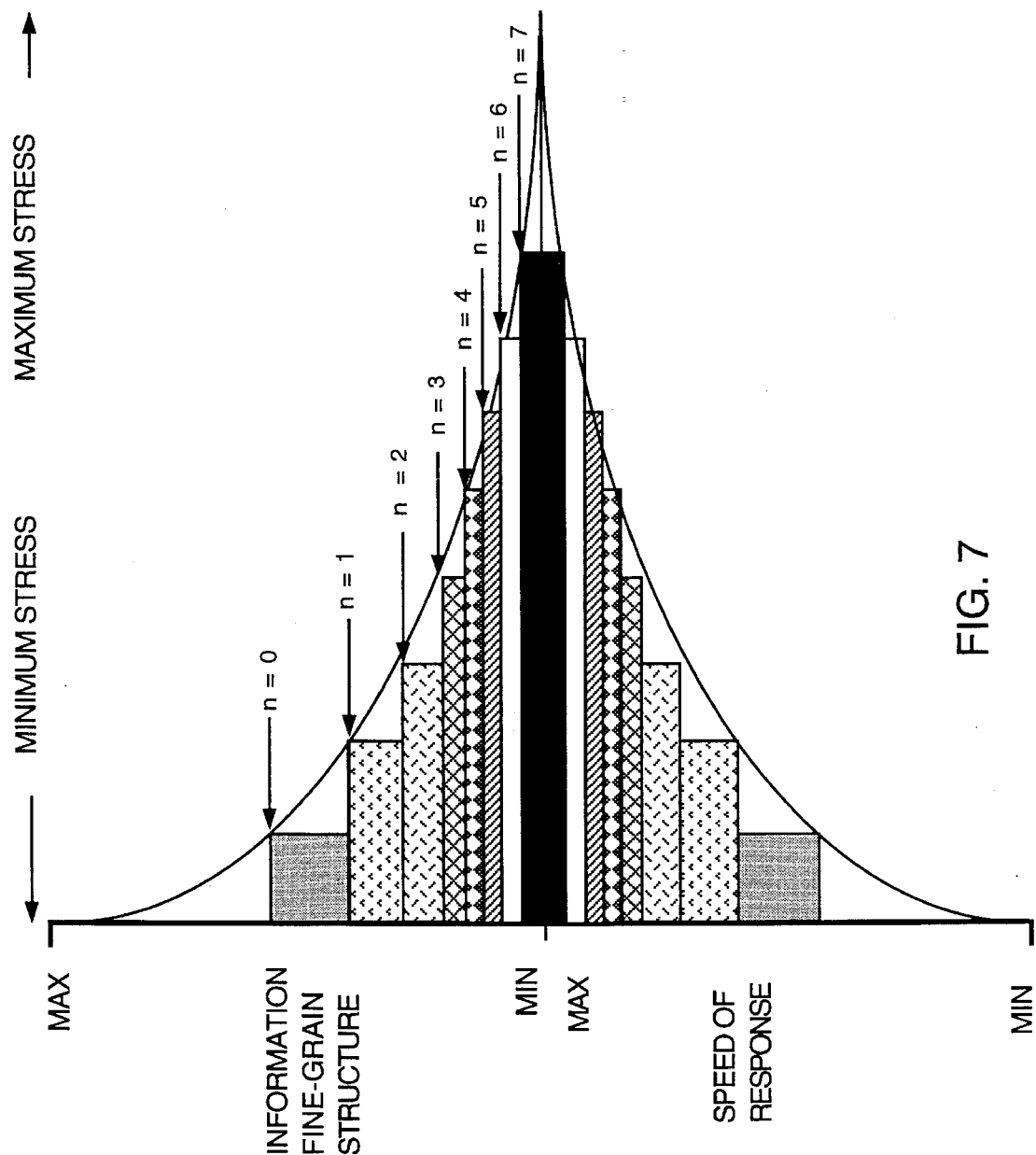

FIG. 7. Abstract is a representation of adaptive control in sensing by use of elementary signals ("elastic control engineering"). The abscissa represents signal level, n, as in $\Delta f \Delta t = f_0 t_0 = (\frac{1}{2})(2n+1)$, n=0,1,2, ... There are two ordinates. The top ordinate indicates information fine grain structure; the bottom indicates system speed of response, from fast (top) to slow (bottom). If n=0, the information fine grain structure is high, but response time is slow. As n increases, the information fine grain structure in the sampled bandwidth, $\Delta F$, decreases, but the response time quickens. For optimized performance, according to the invention, restrict the system to the n=0,1,2 ... etc. points. If the system performance deviates from these points then it is not optimized. The scheme represents "elastic control engineering" in that depending on the temporal restraints on the system, the system can be moved back and forth along the shown curve, jumping from point to point as shown. The scheme also represents "zoom lens" sampling in that the system can sample at the various levels at will thus providing varying levels of discrimination.

FIG. 8. illustrates principles of the invention described schematically. An example is given in which in order to respond to a request for system speed (1), the system energy ratio is increased (2), which results in a signal energy ratio decrease (3) and a level of elementary signal increase (4).

Figure 9:
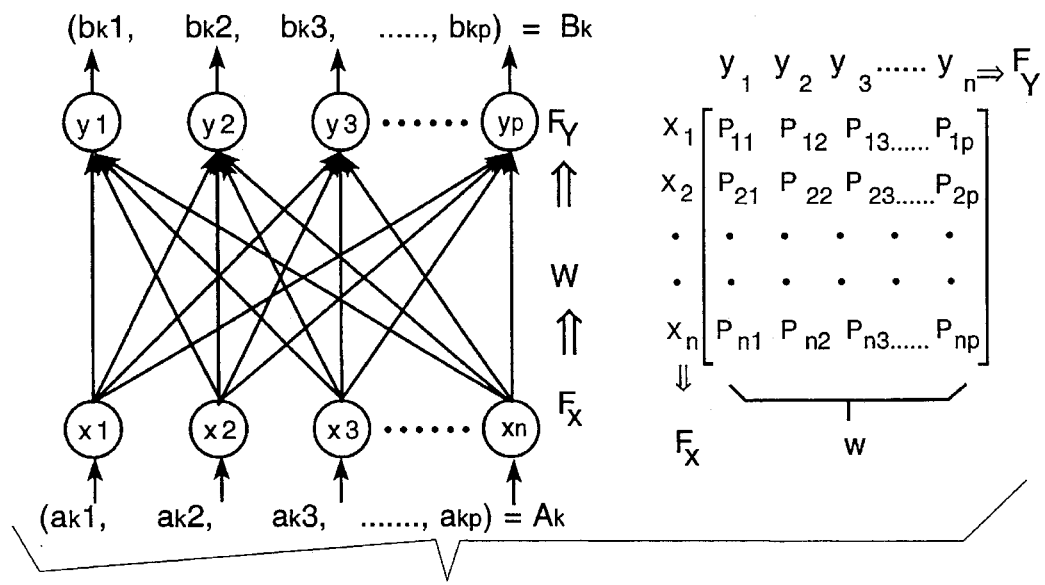

FIG. 9. Schematic representation of a neural net and its matrix formulation. The input vector, $F_x$, is transformed by the matrix, representing the nodal weights of the net, and the input vector is represented by an output vector, $F_y$.

Figure 10:
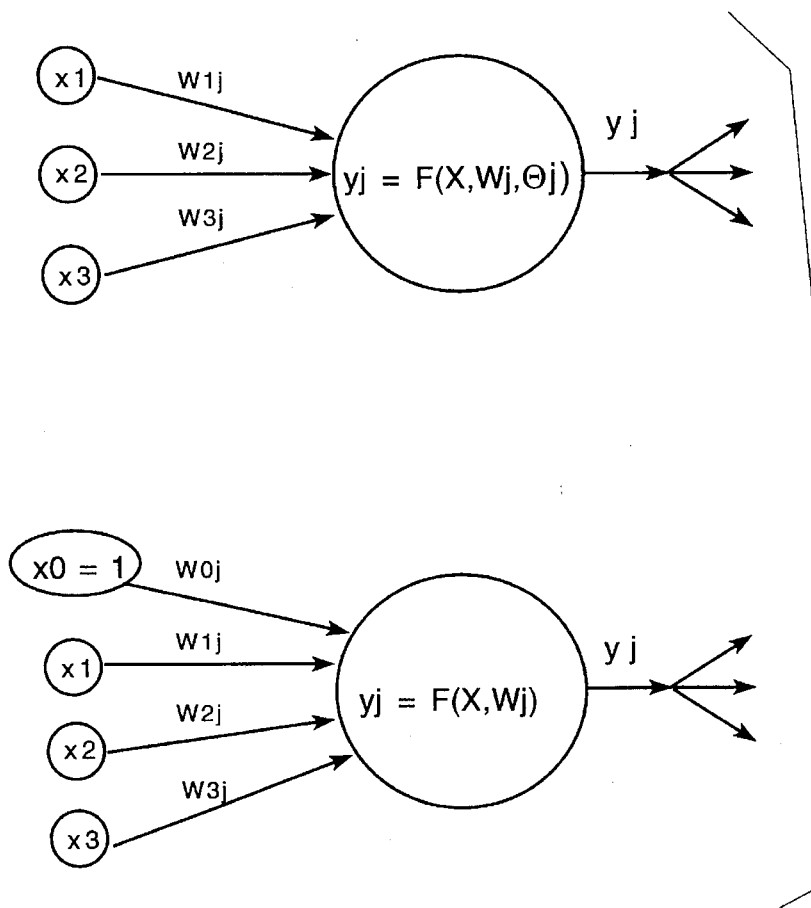

FIG. 10. Schematic representation of a network node. In upper drawing, three inputs are shown $x_1$, $x_2$, $x_3$, with weights, $w_1$, $w_2$, $w_3$. A generic nodal thresholding is shown in represented by $\Theta_j$. In the bottom figure that generic thresholding is shown as an input, $w_{0j}$. The thresholding can be of different forms, e.g., sigmoid, step function, etc.

Figure 11:
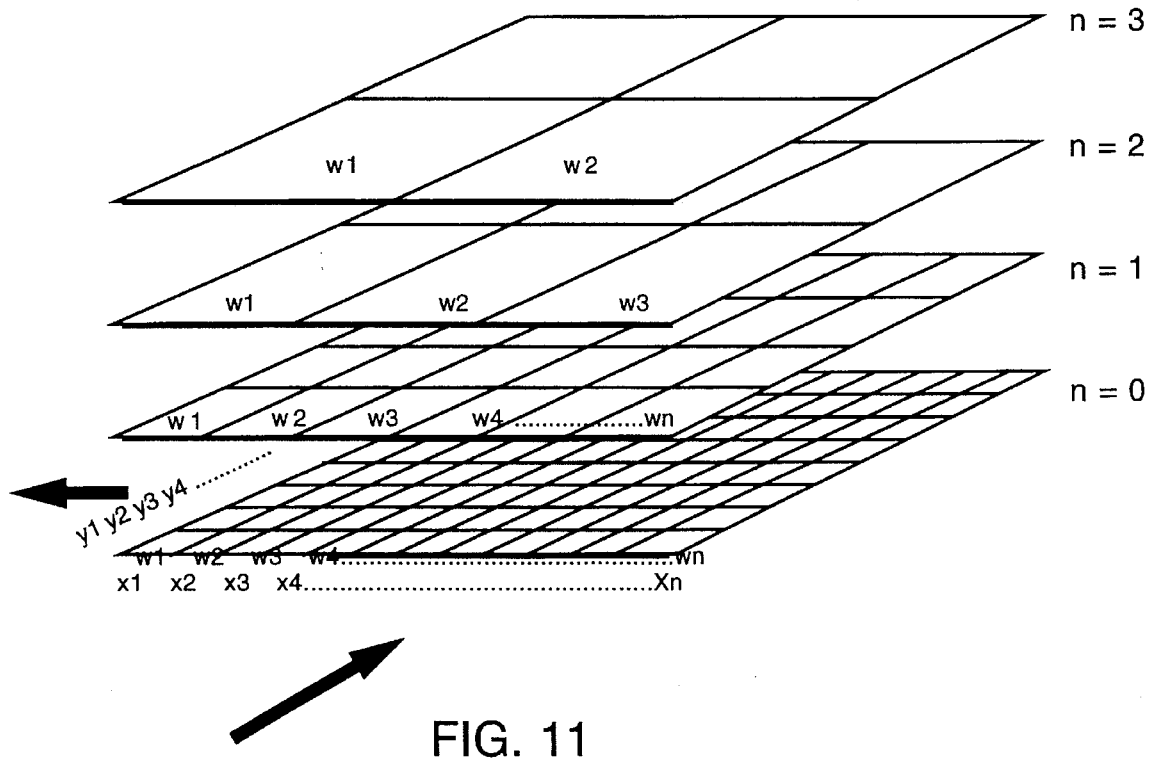

FIG. 11. Schematic matrix representation of a recursive neural net. The input signal is shown at the first layer. The system is defined:

$\Delta F/F_0$=network bandwidth ratio ($\Delta F$=number of classes or dimensionality);

$\Delta T/F_0$=time to closure ratio ($\Delta T$=time to closure);

$\Delta E/E_0$=interconnectivity ratio (locality versus globality), where $E_0 = -(0.5) \Sigma_{ij} w_{ij} y_i y_j$ $\Delta E = -\Sigma_j x_j y_j$; $w_{ij}$=weights, $y_i$=inputs and $x_j$=outputs;

$U=(\Delta F/F_0)(\Delta T/T_0)(\Delta E/E_0)$;

$dU/dt = dU_0 \exp[\lambda_i(t-t_0)]$.

Output, y, exits from first level (n=0) and enters next level (n=1) as input, x, etc. Analog signal inputs are defined as: $\Delta f \Delta t = f_0 t_0 = (\frac{1}{2})(2n+1)$, n=0,1,2, ...

Figure 12:
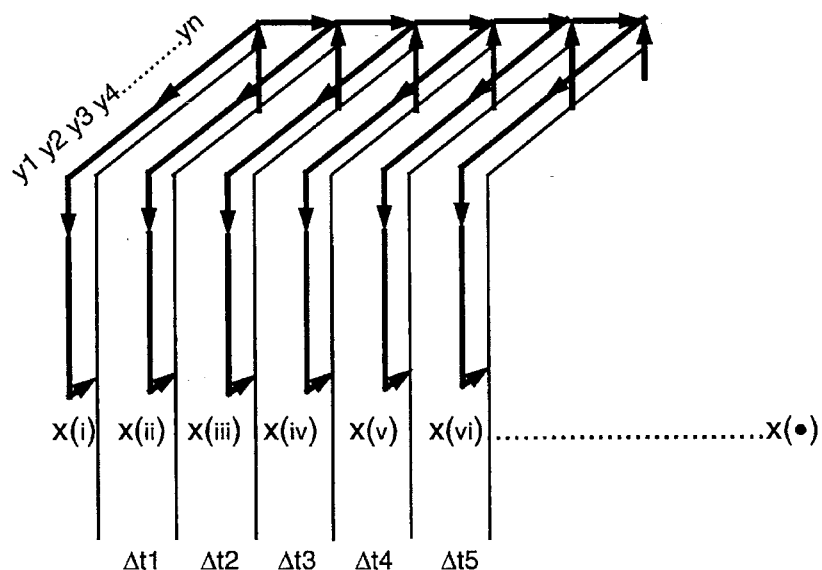

FIG. 12. illustrates progressive entering of input signal, exiting of output signal, which then enters as the input signal in the next layer.

Figure 13:
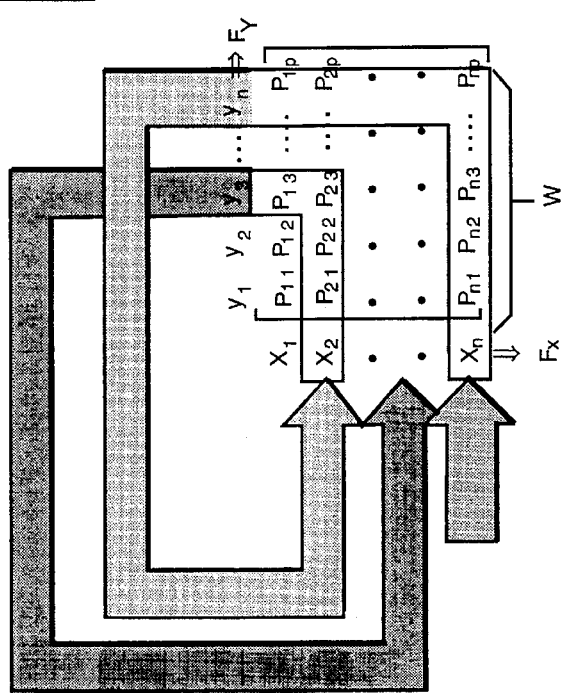

FIG. 13. illustrates recursive operation of network during operation or training.

Figure 14:
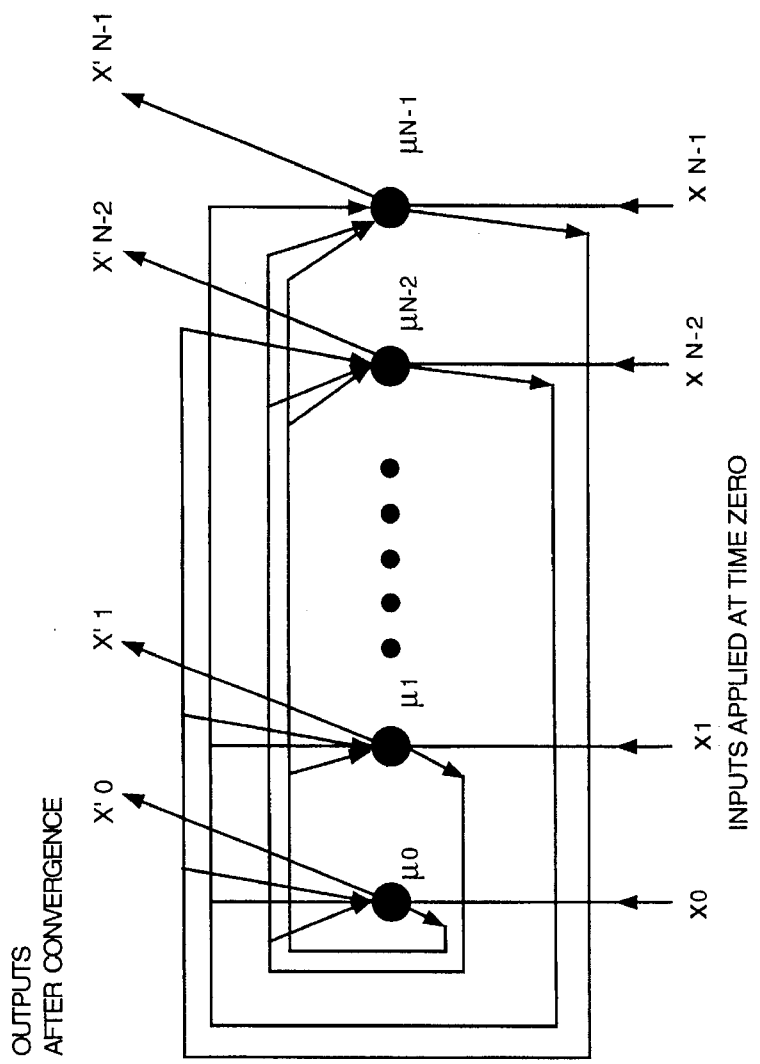

FIG. 14. is an example of a recursive network: the Hopfield network.

Figure 15:
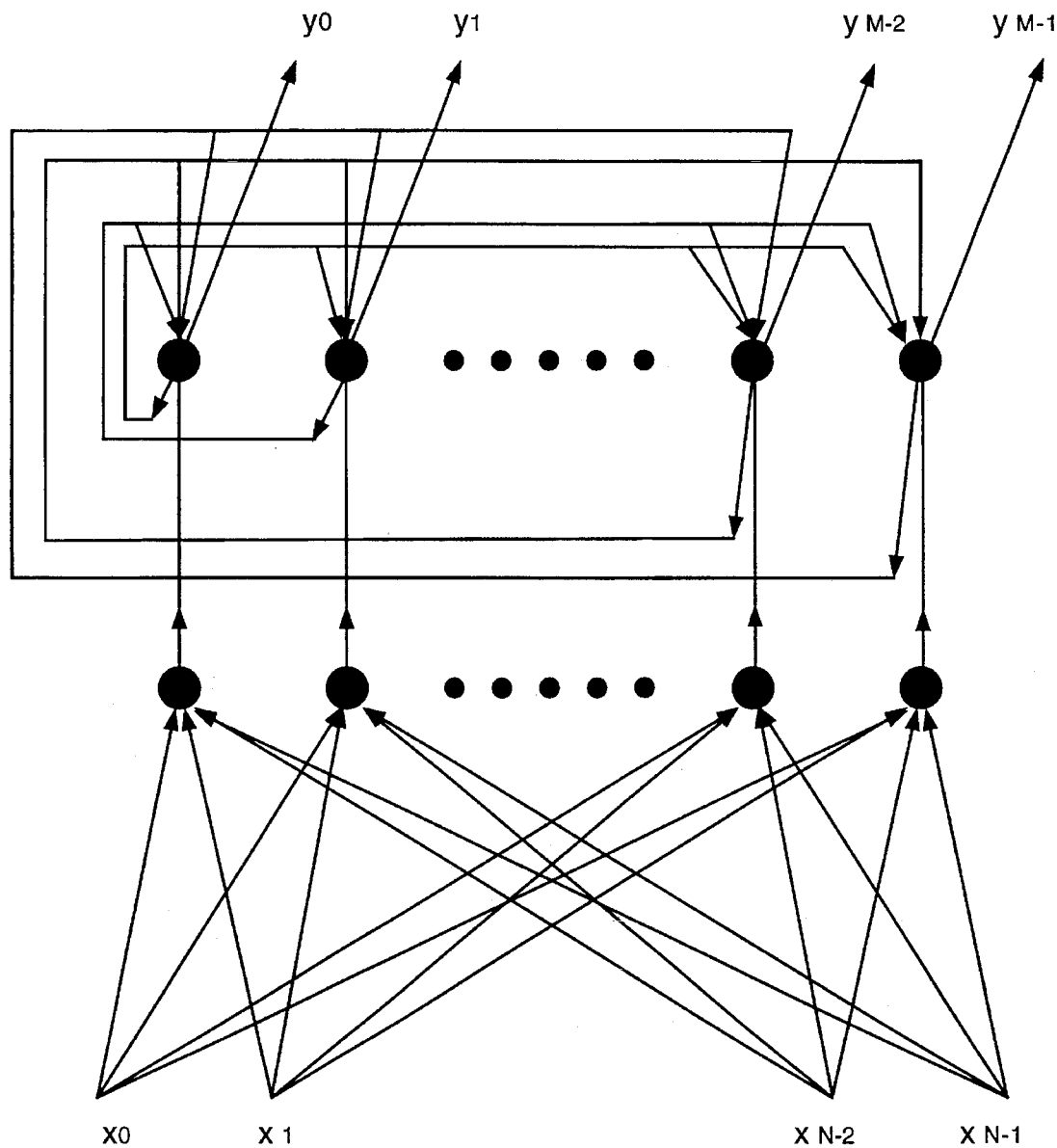

FIG. 15. is an example of a recursive network: the Hamming network.

Figure 16:
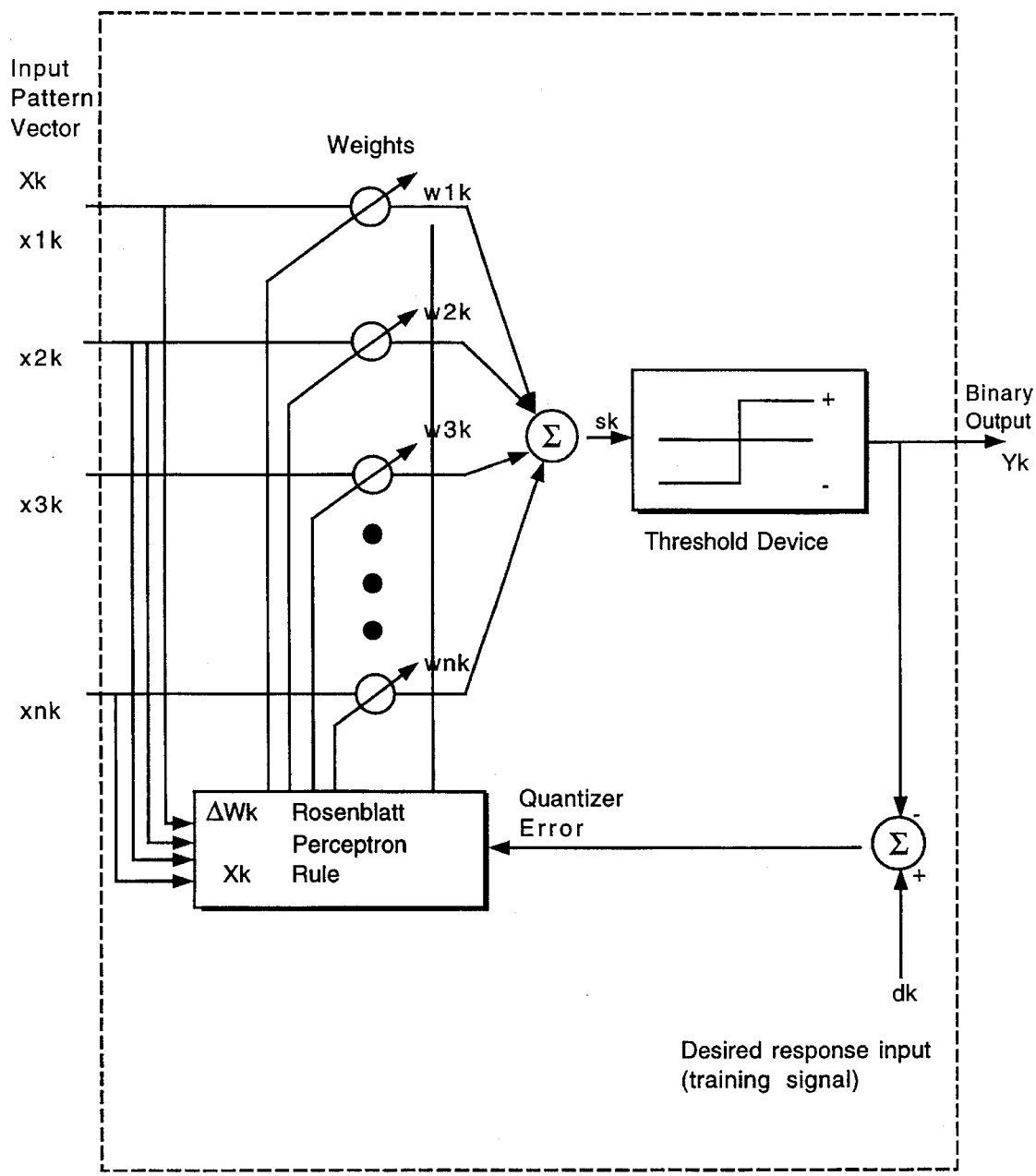

FIG. 16. is an example of recursive training in the Perceptron network.

Figure 17:
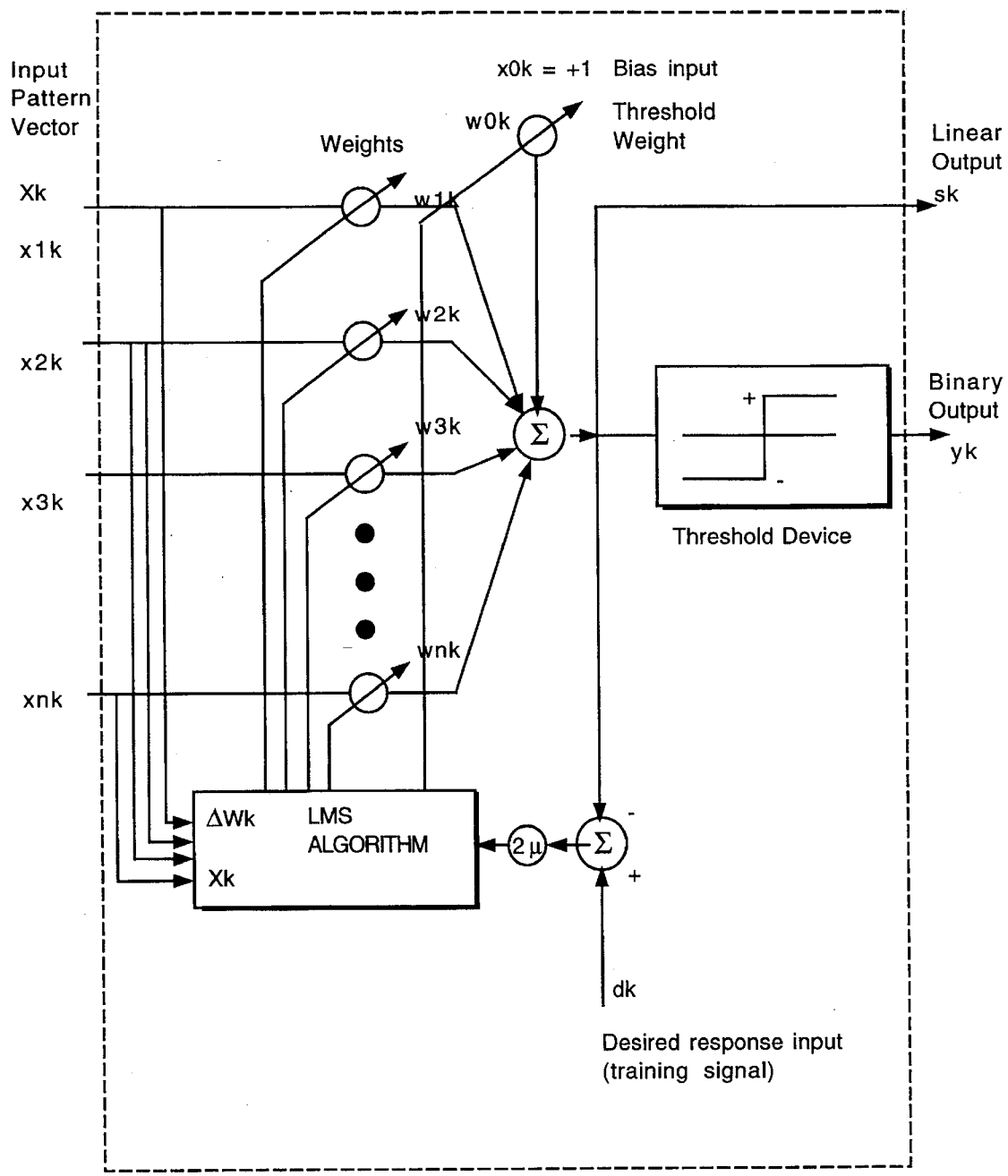

FIG. 17. is an example of recursive training in the Adaline network.

Figure 18:
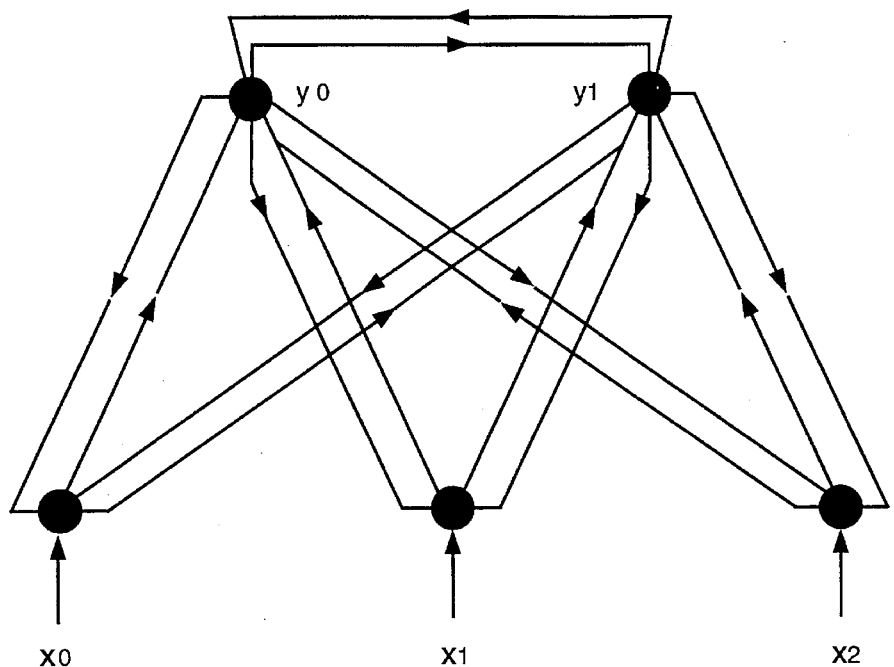

FIG. 18. is an example of a recursive network: the Carpenter-Grossberg network.

FIG. 19. illustrates the recursive procedure of the invention used in the case of two extreme or ideal configurations. $\Delta F/F_0$ is constant in both cases, i.e., there are the same number of nodal points and layers. The shading indicates the ideal case. In (A-Recognition-NW mode), [L,M]=0 or the neural net mode or configuration, there is maximum interconnectivity at maximum time to closure (as in the Hopfield model (Hopfield, 1984; Hopfield & Tank, 1986)). The canonical problems for this architecture are recognition, detection and discrimination. The Liapounov exponents are negative, so the state space vector or volume in phase space decreases in size during the computation. Kolmogorov entropy is zero. An architecture on the far right gives high accuracy but at maximum time to closure or response time. An architecture at the far left gives poorest accuracy but minimum time to closure or response time. In (B-Tracking-CA mode), [L,M]=KI or the cellular automata mode or configuration, there is minimum interconnectivity at maximum time to closure. The canonical problems for this architecture are tracking, assessment and prediction. The Liapounov exponents are positive, so the state space vector or volume in phase space increases in size during the computation. Kolmogorov entropy is positive. An architecture on the far left gives high accuracy but at maximum time to closure or response time. An architecture at the far right gives poorest accuracy but minimum time to closure or response time. Both A and B refer to either the operational or training modes.

Figure 20:
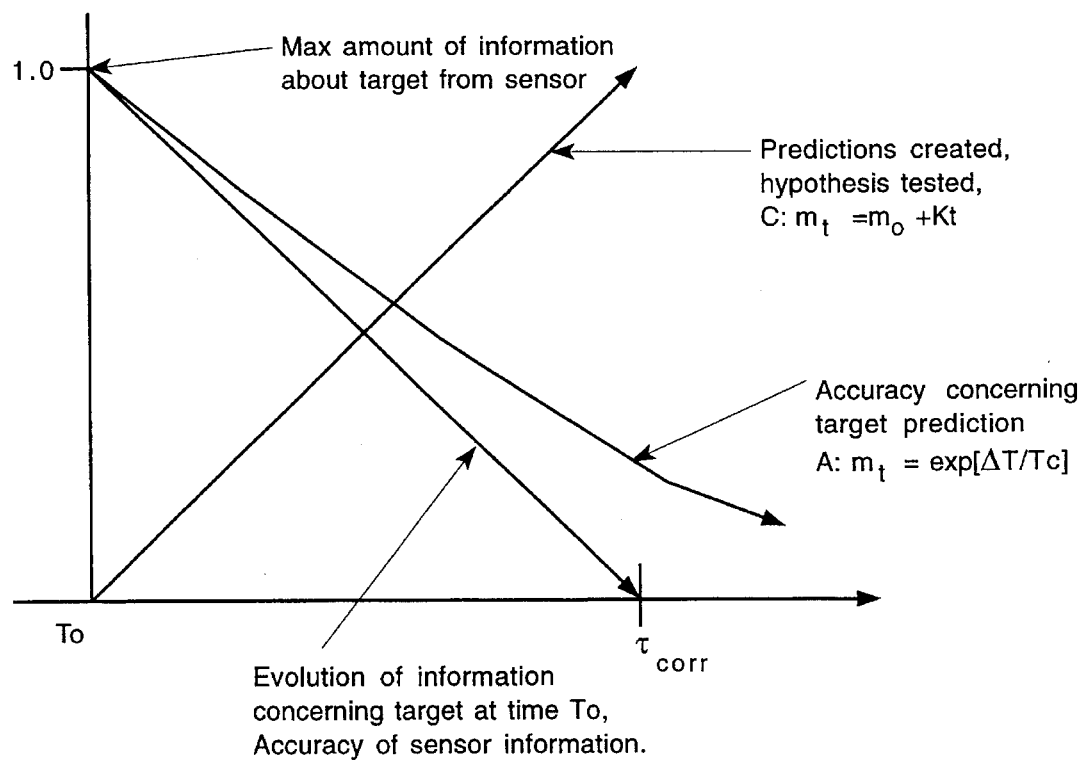
Figure 13A:
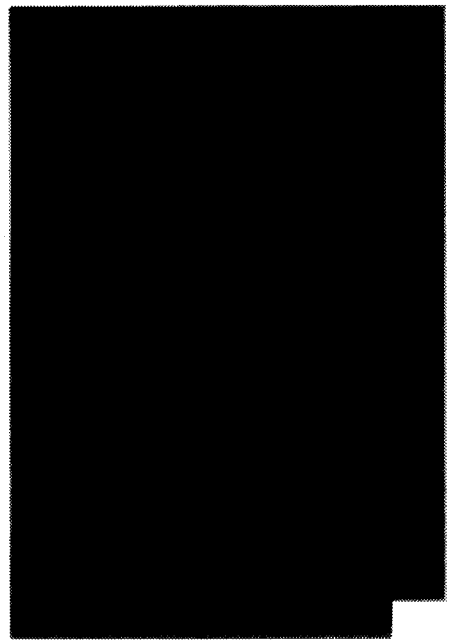
Figure 13B:
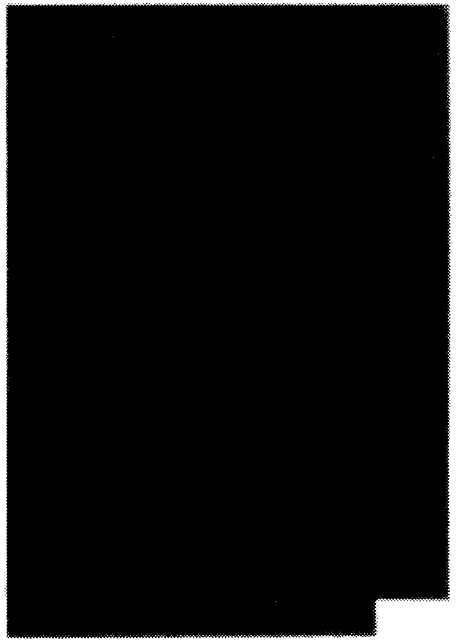
Figure 13C:
Figure 13D:
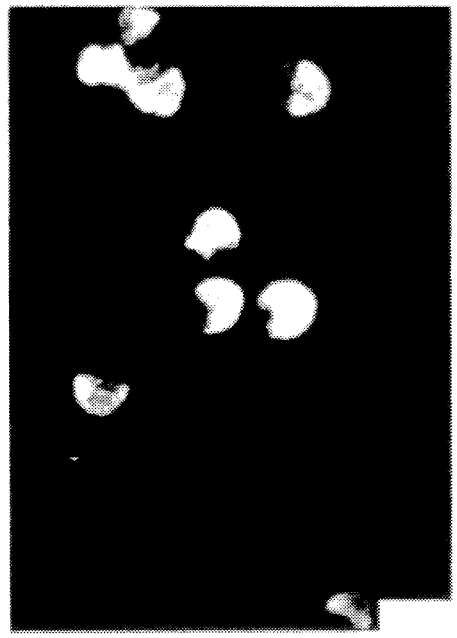

FIG. 20. illustrates evolution of a CA in the track mode and the CA manifold's relation to Liapounov exponents $\Sigma\lambda_i$; $m_i=\exp[-T/\tau_{CORR}]$, $\tau_{CORR}=1/K$, $K=\Sigma\lambda_i$, iff $\Sigma\lambda_i>0$, $\lambda_i(t-t_0)=\ln[\delta x_i(t)/\delta x_i(t_0)]$.

FIG. 21. illustrates network monitoring control. The network's function is monitored at each cycle and Liapounov exponents are estimated during the phase space evolution of the computational patterning. A look-up table, or other means, permits predictions of the subsequent evolutionary behavior due to the time-independence of the Liapounov exponents. If (i) evolution is towards a strange attractor; or (ii) if time-to-closure is too long; or (iii) if the architecture is not optimized to task; or (iv) if other conditions are required, the weights are changed to provide the desired single point attraction, time to closure, architecture, etc.

Figure 22:
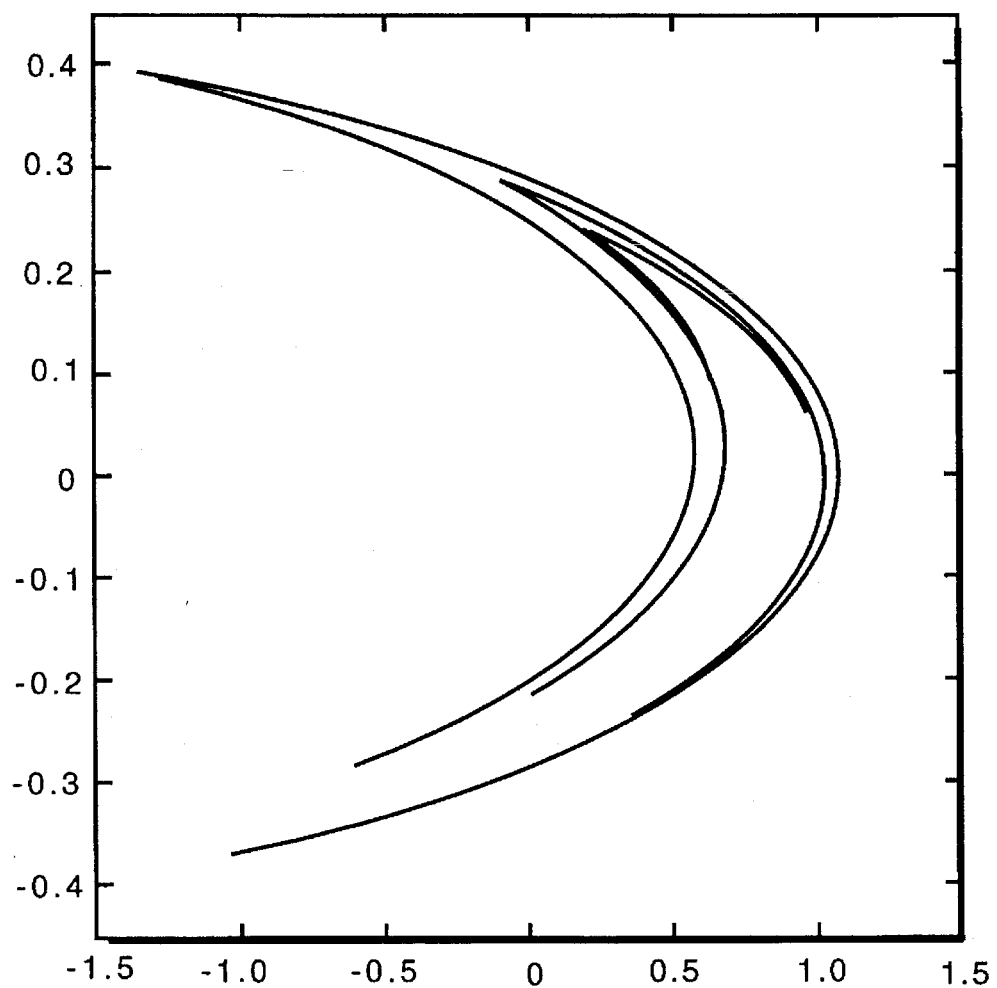

FIG. 22. illustrates the Hénon attractor.

Figure 23:
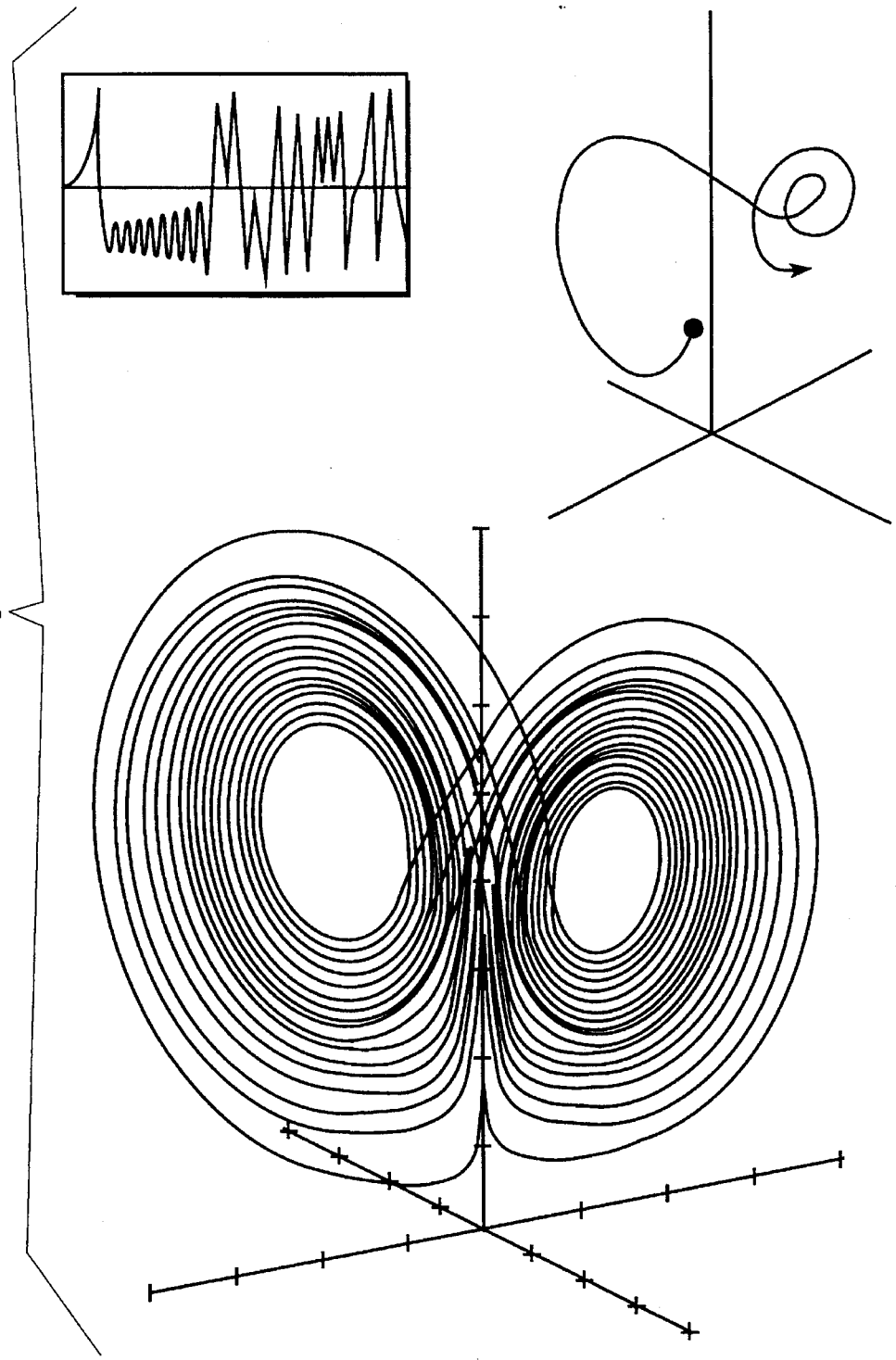

FIG. 23. illustrates the Lorenz attractor.

FIG. 24. is a schematic representation of network behavior during recursive operation or recursive training. The abscissa is energy, $E=E_0+\Delta E$; $E_0=-(0.5)\Sigma_{ij}w_{ij}y_iy_j$; $\Delta E=-\Sigma_j x_j y_j$; $w_{ij}$=weights, $y_j$=inputs and $x_j$=outputs, which is defined by the weights or interconnectivity of the network plus the input vector. The ordinate represents network classification bandwidth levels. Thin lines represent clear and stable classifications or underlying point attractors. Hatched lines indicate chaotic behavior. If the system is in a chaotic region, weights/connections can be changed to bring the system back, or forward, into a stable attractor region.

Figure 25B:
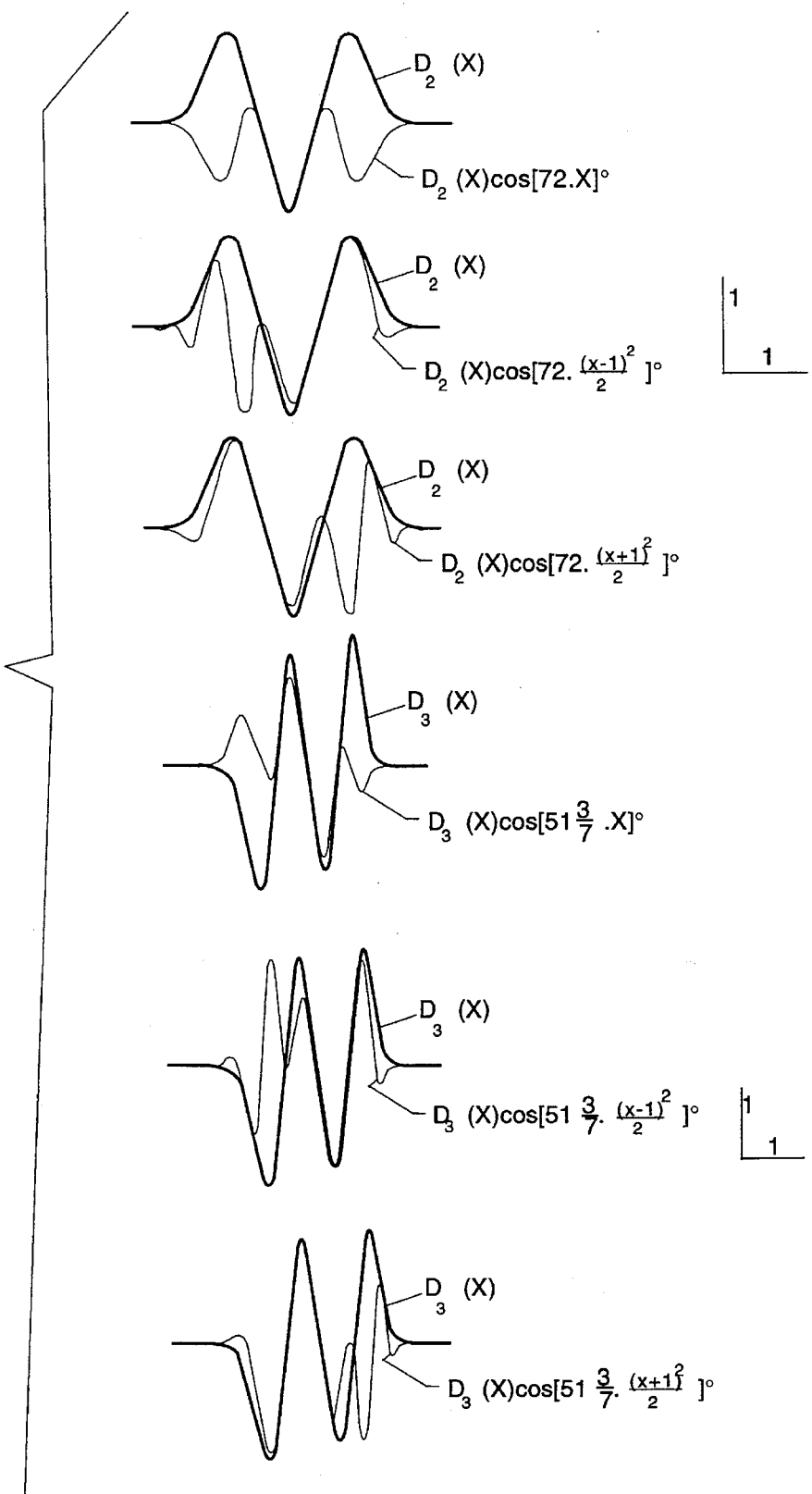

FIG. 25A. illustrates elementary signals with amplitude modulations $D_1(x)$ and $\bar{D}_1(x)$. In the first of the three shown, the modulated signal is a sinuoidal function; in the second and third, the amplitude modulated signal is also frequency modulated—either ascending or descending. The frequency modulation is such that $\Delta f f_0=(\frac{1}{2})(2n+1)$, where $\Delta f$ is change in frequency and $f_0$ is center frequency;

FIG. 25B. illustrates elementary signals with amplitude modulations $D_2(x)$ and $D_3(x)$; otherwise as in A.

Figure 25C:
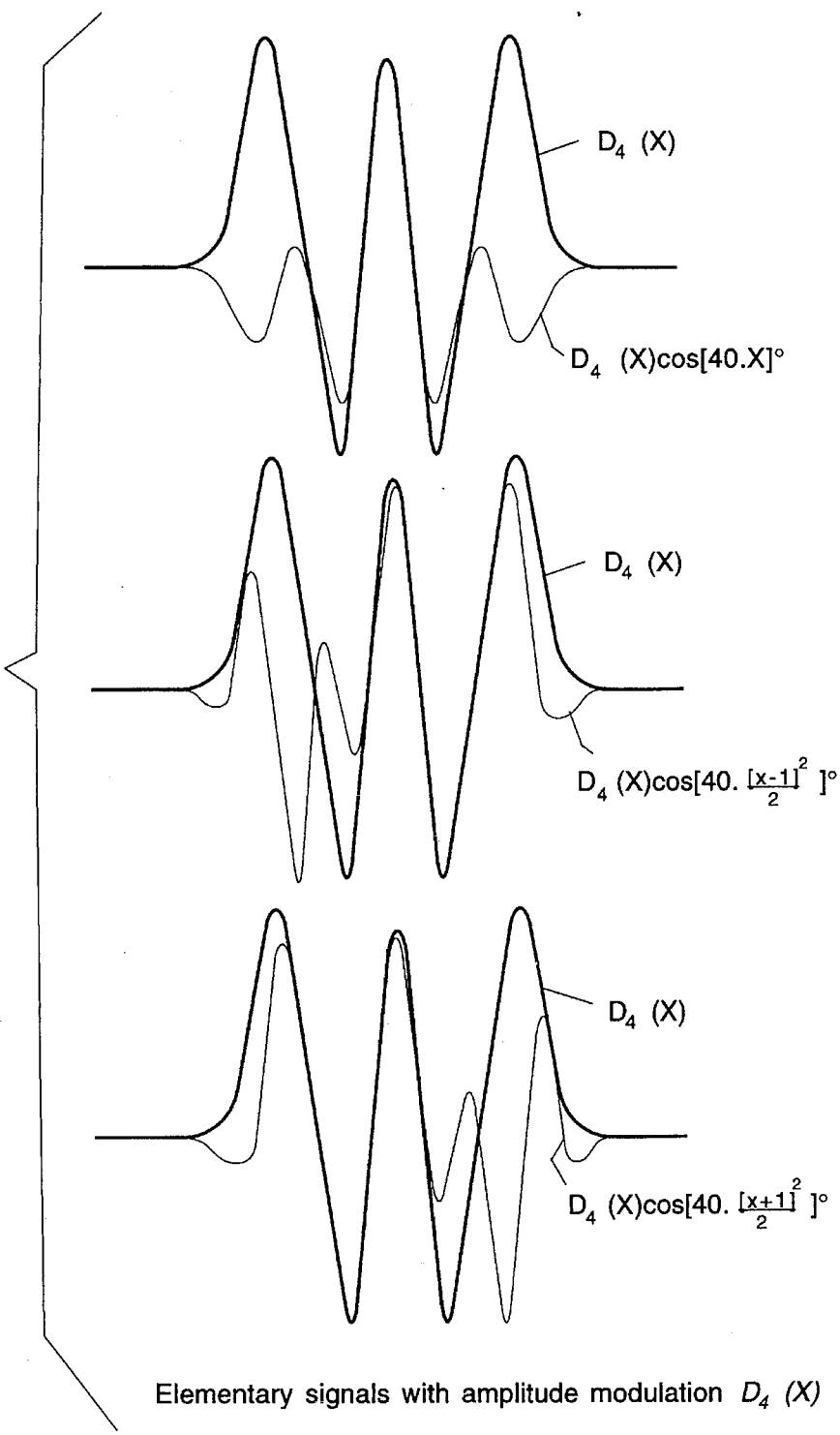

FIG. 25C. illustrates elementary signals with amplitude modulations $D_4(x)$; otherwise as in A.

Figure 25D:
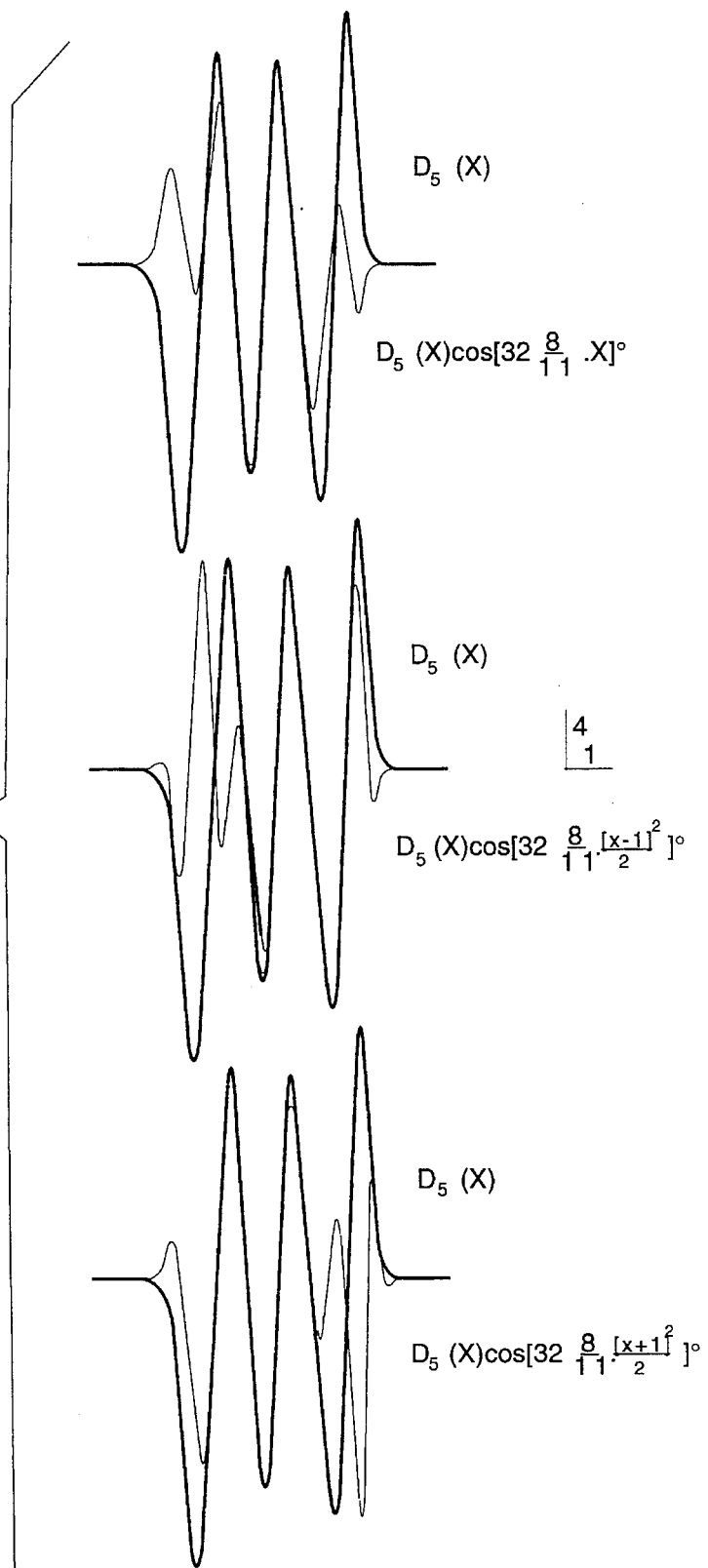

FIG. 25D. illustrates elementary signals with amplitude modulations $D_5(x)$; otherwise as in A.

Figure 26:
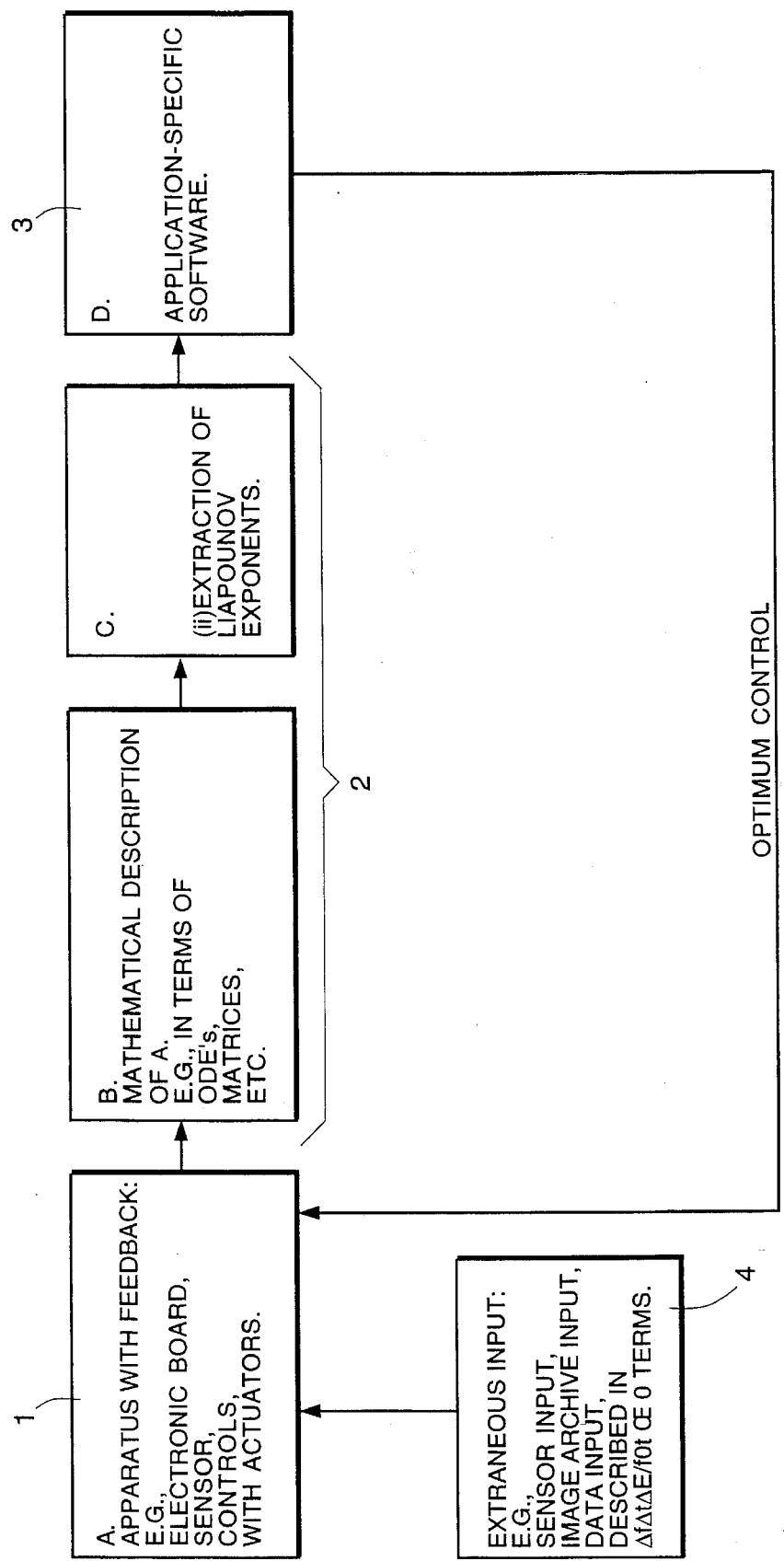

FIG. 26 is a flow-chart of the invention procedures.

DETAILED DESCRIPTION OF THE PREFERRED EMBODIMENT

The present invention addresses improvements in dynamic processes operating over time in phase space while a network operates or learns. For some tasks, the volume in phase space occupied by the network description of a task decreases (e.g., in detection, discrimination and recognition), but in others, it increases (e.g., in tracking, assessment and prediction). The present invention supplies the solution for the requirement that such radically different dynamic behavior requires radically different computational architectures. Different architectures can be obtained by a flexible, reconfigurable universal automata network architecture. The following description focuses on the temporal evolution of a network's operation or training process, an evolution taking place during the time taken to arrive at a solution, i.e., the time to closure.

The present invention also addresses the optimum architectural paradigm for network processors and the criteria to be used when choosing an architecture for multiple tasks, e.g., recognition and tracking. The present invention is a method or process offering criteria for choosing different architectures for different tasks.

The novel approach of this invention also has significant applications to commercial and military systems in that it provides a solution to certain deficiencies in prior art neural net (NN) (Lau, 1991; Sánchez-Sinencio and Lau, 1992) and cellular automata (CA) architectures (Wolfram, 1983; Preston and Duff, 1984; Wolfram, 1986; Toffoli and Margulis, 1987). The present invention remedies the faults of prior art, for which the time to closure (i.e., processing time) is unknown; the architectures are unoptimized to task; the architectures have the inherent characteristic dynamic method of functioning which can contain the uncontrolled dynamic of chaos (path to strange attractor).

The approach of this invention is designed to answer the questions, observations and objections to prior art raised above. Furthermore, the present invention is based on a combined signal sampling, statistical mechanical approach to network dynamics which describes the evolution of a network mapped into a phase space representation (cf. Aliaga et al, 1987, 1988; Duering et al, 1985, 1987; Otero et al, 1982, 1986; Yasue et al, 1988; Misawa et al, 1987; Eckmann & Ruelle, 1985; Kinzel, 1990), control theory (Narendra et al, 1991) and algebraic topology (Olver, 1986).

Any signal sampling and conversion device can be represented as a discrete dynamical system (see FIGS. 14–18). Thus a discrete, combined signal-statistical mechanical phase space representation of a system's state space evolution is possible. Such a sytem's flexible dynamic reconfigurability, temporal evolution, recognition and detection capability, prediction and signal a-d conversion capability, can be precisely defined.

Some of the features of the invention are:

A combined signalling-statistical mechanical formulation relates both information and energy in a single optimization principle, providing a unique maximum entropy formulation for flexible, reconfigurable dynamical systems (FIG. 1).

A formulation is describable in Liapounov function terms. Liapounov functions can be described as Lie groups when expressed by the associativity condition for structure functions. Thus any self-mapping, whether by neural net or cellular automata, can be expressed in such terms.

According to the invention a network signal sampling and conversion can be used to define both the signals sampled, and the resolution limits of systems sampling those signals (FIGS. 1 and 8). A hierarchy of orthogonal elementary signals can be derived commensurate with (a) increasing/decreasing system energy levels, N, of the system states ($\Delta F\Delta T=F_0T_0=\frac{1}{2}(2N+1)$, N=0,1,2, ... ), into which the system total energy, $E_N$, of the system is partitioned;

(b) decreasing/increasing entropy (information) or precision associated with constant sampled energy, $E_n$: $\Delta f \Delta t = f_0 t_0 = \frac{1}{2}(2n+1)$, $n=0,1,2,\ldots$ (c) decreasing/increasing response time or time to closure, $\Delta T$ of the signals sampled: $\Delta F \Delta T = F_0 T_0 = \frac{1}{2}(2N-1)$, $N=0,1,2,\ldots$ The lowest energy level of those signals producing maximum total entropy or information is commensurate with a set temporal window of the sampling and converting system providing optimized performance under different set conditions. If, due to temporal limitations on the signal conversion process, which are imposed by external control override, a system's temporal signal a-d conversion window must be decreased, then the maximum entropy (information) for that particular decreased window is achieved by a constant system indication limit, U, i.e., a phase space representation of the resolution limit of the system due to a contravariance between (a) the energy level, N, of the signal conversion, $\Delta E_N/E_0$, (b) the temporal bandwidth $\Delta T_N/T_0$, and and the frequency bandwidth, $\Delta F_N/F_0$, so that:

$$U = [\Delta E_N/E_0] \cdot [\Delta T_N/T_0] \cdot [\Delta F_N/F_0],$$

is maintained as a constant relation (cf FIG. 8), where:

$\Delta E_N/E_0$=interconnectivity (degree of locality/globality of interconnections) and weighting.

$\Delta T_N/T_0$=time to closure or time to end of computation.

$\Delta F_N/F_0$=bandwidth of the architecture or number of classes or dimensionality permitted.

This optimization condition, ensures both maximum entropy for discrimination under conditions of high speed signal conversion, and also dynamic reconfigurability. Application of this resolution limit approach to analog-to-digital conversion devices, i.e., to compute-bound applications which occur in radar, ladar, lidar, sonar, and robotic vision, sensing and acoustics, provides a rigorous definition of an automata network defined as a continuum between two ideals: the cellular automata (CA) network architecture with local interconnectivity and local transition rules, and the neural network (NN) architecture with global interconnectivity and global transition rules (cf FIG. 19).

The behavior of the dynamically reconfigurable automata network over the architectural continuum from CA to NN is defined with respect to discrete (quasi-quantum) changes in a second indicator limit, V, defined as a phase-space volume or state vector defining the input or output signal set, in which $E_0$, a second energy variable, is defined with respect to the architecture's interconnectivity. This second indicator limit, or volume, is defined in signal phase space as the dynamic mapping of a set into itself:

$$V = [\Delta E_r/E_0] \cdot [\Delta t_r/t_0] \cdot [\Delta f_r/f_0],$$

and this dynamic behavior is described by the Liapounov exponents of the Liapounov description of the system.

Described in terms of the indication limits U and V, a flexible bi-Hamiltonian system can be defined for both the sampling-system, the signals-prior-to-sampling and the signals-as-sampled. In one sense the classification task is then defined as the operation $V_{OUTPUT} = V_{INPUT} U.$ If $V_{INPUT} = U^*$, then the classification (NN) task is:

$V_{OUTPUT} = \Sigma_i 1_i.$

The present invention incorporates the following features:

I. At one pole of the automata network architectural continuum—the CA network—the phase space behavior is described by Liapounov exponents which sum positively and equal the Kolmogorov entropy for the particular architectural connectivity considered. The dynamic behavior of the ideal CA architecture is irreversible, and optimum for tracking and problems requiring hypothesis-production (e.g., assessment and prediction). In the case of this CA architectural configuration, the phase-space indicator volume, V, the output, increases over the computational time to closure.

II. At the other pole of the automata network architectural continuum—the NN—the phase space behavior is described by Liapounov exponents which sum negatively and the Kolmogorov entropy for the particular architectural connectivity considered is zero. The dynamic behavior is reversible, dissipative, and optimum for recognition, detection and discrimination applications. In the case of this CA architectural configuration, the phase-space indicator volume, V, the output, decreases over the computational time to closure (cf FIG. 19).

In the NN architectural configuration, no information is created and the temporal evolution of the statistical distribution of state occupancy, $\rho$, can be described by a Liouville equation, in which a Liouville operator, L, acts on $\rho$, and reversibility is preserved. In the CA architectural configuration, on the other hand, information created at a rate, K, and an information operator describing the statistical distribution of state occupancy, M, does not preserve reversibility.

In the case of a hybrid NN/CA automata network, the commutation relation between L and M is:

$$[L,M] = LM - ML = \text{the common eigenfunctions of L and M}.$$

This comutation relation definition of network architecture allows the following definitions (FIG. 19):

If $[L,M]=0$, the automata network is in an ideal NN architectural configuration.

If $[L,M]=KI$, the automata network is either an NN/CA architectural hybrid or an ideal CA architectural configuration.

As the Liapounov exponents describing the dynamic evolution of the indicator volume, V, are time-independent, the hybridization of a particular automata network, i.e., its position on the continuum between ideal CA and ideal NN architectures, can be determined at the start of a recursive computation, or the initial stages of change, as in the training process, in the dynamic evolution of V and before closure. Not only can the architectural hybridization be precisely determined, but also the final attractor form, which, in the case of the CA network, can be chaotic (cf. Reidel et al, 1988; Eschenazi et al, 1989; De Souza et al, 1990). If required, e.g., in the case of the action closing on a strange attractor, the degree of architectural hybridization and the final attractor form can be altered by a control monitor (cf. FIG. 21).

The hybridization of an automata network from a NN form to a CA form is essentially a change from a dynamical system with memory (a non-Markovian process) to a Markov process. Ideal CA systems are nonintegrable and ergodic. Ideal NN systems are integrable and nonergodic.

CA network architectures are isomorphic with optimum state estimation processes, e.g., extended Kalman filtering processes (FIG. 20). In the case of the extended Kalman filter (Sorenson, 1985), the evolution of optimum states of the state vectors in stochastic state space permits a partial derivative description in terms of the estimated vectors, i.e., permits a Liapounov equation process description. Thus, a CA isomorphism to the Kalman filter in its extended or nonlinear version is justified.

The extended version can be approximated by the linear Kalman filter by defining the evolution matrices and vectors instantaneously, and not iteratively. However, this linearization does not permit a Liapounov description and the linear Kalman filter has no evolutionary discrete behavior. In the linear case there is no CA isomorphism as the linear Kalman filter is a linear matched filter using linear a priori transfer functions, rather than nonlinear transfer functions generated from historically preceding input—i.e., recursively. However, in the case of nonrecursive operation the system still converges on one of two energy minima, to which of these the network converges depends on the initial conditions.

A third version of the Kalman filter, the adaptive Kalman filter, does meet the requirements for CA isomorphism. This is because, as not all of the stochastic state space descriptions are known quantities, the filtering algorithm must permit optimum estimations of the state as well as the unknown transfer function matrices. This estimation is performed in real time on the basis of the arriving or incoming data.

In the case of the Wiener filter, and in the situation where an optimum criterion is required for the state vector estimation, the canonical description of the dynamical behavior is again a CA isomorphism. The criterion for the behavior of a predictive filter to be in the CA mode is that an optimization must be performed in real time. This criterion is not met by the linear Kalman filter, because the matrices of the stochastic state space are known a priori and do not evolve over time.

The invention provides a top-down approach to unifying NN and CA networks in a flexible overarching controlled procedural algorithm, and provides rational decision rules for the choice of a particular architectural design for a specific problem or function (e.g., recognition, tracking, etc.), i.e., for the choice of the architectural paradigm. That choice will change depending on the type of network task to be performed. The present invention addresses the fact that no particular architectural paradigm should be favored irrespective of the types of tasks to be performed by the architecture. The invention is the only general purpose network architecture, as all others of prior art are particular expressions of flexible dynamic reconfigurability in response to specific canonical problems, tasks, mappings and predictions.

The methods of this invention provides the rationale for control over computational speed and can be said to be "self aware" of the nature of the computational process (because the Liapounov exponents are monitored, calculated "on the fly", and even changed during the iterative procedure of operation and training, cf. FIG. 21), permitting undesirable closure forms to be avoided. The approach is also compatible with other approaches to state prediction and estimation and also image recognition processes already in existence. The invention supplies to these processes flexible optimized control through dynamic reconfigurability and trading, i.e., improved function. In the case of image recognition, enhancement and "highlighting", the approach herein is compatible with renormalization group theory. FIG. 21. shows the feedback interactive design which provides the control necessary to obviate closure to chaotic attractors and closure in too lengthy a time. Methods for obtaining the Liapounov exponents are given in: Wolf et al, 1985; Riedel et al, 1988; Holzfuss & Lauterborn, 1989; Ott et al, 1989.

Control procedures involve changing the weighting and interconnectivity on each nodal point to achieve different Liapounov exponents, i.e., a different end result or closure, as well as a different architectural configuration. Achievement of this objective permits the precise time to closure to be set, or prevents closure to a chaotic attractor.

Dynamical systems procedures:

The algebraic logic and topology underlying this invention originates from the the matrix formulation of ordinary differential equations (ORDs). Solutions of ordinary differentials equations (ODEs) are based on the invariance of such ODEs under a continuous group of symmetries. A symmetry group of a system of differential equations is a group which transforms solutions of a system to other solutions. The infinitesimal generator of a symmetry group is a vector field whose associated flow coincides with the group it generates. The bridge between the description of ODEs and patterns to be recognized or a prediction and estimation task to be performed is that all these can be given a matrix representation which evolves under a symmetry group to a solution or output (FIGS. 9, 10, 11, 12, 13). The present procedure involves the description and treatment of matrix representations of networks, and their inputs and outputs, in the same fashion as the treatment of matrix representations of ODEs and their solutions.

For example, the task of network classification can be placed within the context of group-invariant solutions. Inputs to the network, i.e., a matrix representation of ODEs, which are invariant under a network transformation, i.e., an r-parameter symmetry group, result in outputs which can be described as a matrix representation of a system of ODEs involving r fewer independent variables. In a sense, "input" ODEs are "classified" as output ODEs.

The relationship between network nodal interconnects and network layers can also be described in this way. The nodal interconnects can be described by a local Lie group and the algebra of its covering layer by a global Lie group. As every local Lie group is locally isomorphic to a neighborhood of the identity of some global Lie group, the relationship between local nodal interconnects and the covering layer is well described.

Dynamical systems of the type:

$$dx(t)/dt = F(x(t);\mu)$$

define the context of procedures disclosed herein, where: $x=(x_1, \ldots, x_n)$ are variables characterising the temporal evolution of the system in n-dimensional phase space. $F=(F_1, \ldots, F_n)$ gives the coupling between different variables; m is a control parameter. $\rho(t)$ is a probability distribution evolving in a phase space of dimensions n and describing the temporal evolution of the system.

$$\delta V = \delta x_1, \ldots, \delta_n$$

is a finite volume in phase space associated with $\rho_0$ and is a representation of the indication limits U and V from the system and signal representations respectively. The temporal evolution of the system, defined with respect to an uncertainty in the starting condition, $\rho_0$, i.e., the uncertainties, $\delta x_i$ associate with $\delta V$, is given by:

$$d(\delta x_i)/dt = \Sigma_j [(\partial F_i(x(t);\mu)\partial x_j)\delta x_j(t)], \quad (1)$$

with the coefficients, $\partial F_i(x(t);\mu)\partial x_j$, forming a matrix L leading to the characteristic exponents of Liapounov: $\lambda_i$.

The approximate solution is Eq (1) is:

$$\delta x_i(t) = \delta x_i(t_0) \exp[\lambda_i(t-t_0)], \quad (2)$$

and the temporal evolution of the volume element $\delta V$ defined by $\rho_0$ is:

$$\delta V(t) = \delta V(t_0) \exp[\Sigma_i \lambda_i (t-t_0)]. \quad (3)$$

A conservative system is defined as one in which:

$$\Sigma_i \lambda_i = 0 \quad (4)$$

A dissipative system appropriate for target recognition (including stationary, periodic stationary, periodic and quasiperiodic solutions) is defined as one in which:

$$\Sigma_i \lambda_i < 0, \quad (5)$$

and where the phase space, defining the evolving system, contracts during temporal evolution or $$(d/dt)\delta V(t) < 0. \quad (6)$$

For such a system, the subspace asymptotically reached is the attractor of the system:

$$\delta V(x_1, x_2, x_3) \rightarrow \delta V([x_1]_{MIN}, [x_2]_{MIN}, [x_3]_{MIN}) \quad (7)$$

or $$\delta V(\Delta f/f_0, \Delta t/t_0, \Delta E/E_0) \rightarrow \delta V([\Delta f/f_0]_{MIN}, [\Delta t/t_0]_{MIN}, [\Delta E/E_0]_{MIN}).$$

There are three main types of solutions for $$\lambda_1(\Delta f/f_0), \lambda_2(\Delta t/t_0), \lambda_2(\Delta E/E_0):$$

(-,-,-) (stationary solution),
(0,-,-) (limit cycle solution),
(0,0,-) (torus, two frequency solution).

An information producing (potentially chaotic) system suitable for target tracking is defined as one in which:

$$\Sigma_i \lambda_i > 0. \quad (8)$$

The rate of information production, K, is the Kolmogorov entropy:

$$K = \Sigma_i \lambda_i \text{ if } \Sigma_i \lambda_i > 0, \quad (9)$$

K=0, otherwise, and $$(d/dt)\delta V(t) > 0,$$

i.e., for such a system, the subspace asymptotically reached is a strange attractor of the system, not a simple attractor (FIGS. 22–24).

A system in which $\Sigma_i \lambda_i > 0$ defined over $x_i (x_1 = \Delta f/f_0, \Delta t/t_0, \Delta E/E_0)$ will be predictable with an accuracy $\delta x_i(T)$ after a time interval $T-T_0 = \Delta T$. The time interval, $T-T_0$, is the correlation time, $T_{CORR}$, of the system. After $T_{CORR}$, the final state of the system is not predictable from the initial state.

$$\lambda_i(\Delta T) = \ln [\delta x_i(t)/\delta x_i(t_0)], \text{ for } \lambda_i > 0 \text{ (tracking condition)}, \quad (10)$$

$$x_1 = \Delta f/f_0, x_2 = \Delta t/t_0, x_3 = \Delta E/E_0,$$

Prediction is complete when:

$$x_1 = X_i = \Delta F/F_0, x_2 = X_2 = \Delta t/t_0, x_3 = X_3 = \Delta E/E_0.$$

Within the context of the above described formulation of generalized networks, network architectural types find clear definitions:

1. NN-Mode: Neural nets are reversible, evolve with negative Liapounov exponent description, and are dissipative, ideal for recognition tasks, performing operations described by an L operator and with K=0.
2. CA Mode: Cellular automata are irreversible, evolve with positive Liapounov exponent description, and are nondissipative, information productive, ideal for tracking tasks, performing operations described by an with M-operator and with K>0, and $T_{CORR} \approx 1/K$.
3. Hybrid NN/CA-Modes are defined as intermediate between NN and CA ideal modal architectural forms.

Operator definitions:
L-Operator:
The temporal evolution of $\rho$ can be described by the Liouville equation:

$$i\partial r/\partial t = L\rho, \quad (12)$$

where L is the Liouville operator acting on $\rho$. The solution of Eq. (12) is:

$$\rho(t) = \exp[-iLt \, \rho(0)]. \quad (13)$$

The time evolution operator, $\Psi = \exp[-iLt]$ constitutes the unitary dynamical group which is generated by L. This group is invariant under time reversal. Therefore, a description of the temporal evolution of r by means of L provides complete reversibility.

M-Operator:
Information, m, is created with a rate $K \geq 0$ by an information producing system. m is equivalent to $\ln \delta V$. Therefore, over time tracking information increases:

$$m_t = m_0 + K_t, \quad (14)$$

if K>0.

Referring to FIG. 20, in the case of an information producing system:

$$m_t = \exp[-T/T_{CORR}],$$

$$T_{CORR} = 1/K,$$

and $$K = \Sigma \lambda_i, \text{ if } \Sigma \lambda_i > 0.$$

The information operator, M, whose eigenvalues are given by $m_t$, is:

$$M\rho(t) = m_t \rho(t) = (m_0 + K_t)\rho(t). \quad (15)$$

The quantities and K are time-independent numbers, but the information, $m_t$, increases with progressive time t. The operator, M, does not depend on time but acts on a time-independent distribution, $\rho(t)$, providing a temporally increasing eigenvalue, $m_t$, for K>0.

The operator, M, does not preserve reversibility and the commutation of L and M is:

[L,M]=LM−ML=common eigenfunctions of L and M.

If [L,M=0, then the dynamical evolution of a system can be given with an accuracy identical to the accuracy of some initial condition. This is the NN-mode.

However, with:

$$[L,M] = KI \quad (16)$$

the temporal evolution of the system cannot be predicted with an accuracy of measurement taken at time $t_0 < t$.

When commutation relations of the form of Eq. (16) describe a system, a simultaneous determination of the informational content of a solution of the system and of its detailed position in phase space is impossible. Therefore, a "trained" recursive network can evolve towards a strange attractor from certain input conditions, e.g., a target in clutter (FIGS. 22, 23, 24). Furthermore, a "trained" non-recursive network can directly, and non-recursively, procede to one or other of bipotential minima under the same conditions.

Primitives (elementary signals) of this invention:

The primitive signals of the system are related to Gabor's early work (1946) on the advantages of Gaussian modulated wavepackets or elementary signals. However, it can be demonstrated (Barrett, 1970–1980) that:

(i) Two uncertainty products (not one) over four signal dimensions are required to unambiguously define an elementary signal: $\Delta f \cdot \Delta t = c$; $f_0 \cdot t_0 = c$; where c is some constant.

(ii) The Gabor Gaussian elementary signal is actually the first (smallest) of a series of increasing size in an expansion:

$$\Delta f \cdot \Delta t = \tfrac{1}{2}(2n+1), \ n=0,1,2,\ldots$$

$$f_0 \cdot t_0 = \tfrac{1}{2}(2n+1), \ n=0,1,2,\ldots$$

The conditions (i) and (ii) result in an elementary signal with affine properties, i.e., the signals developed by the inventor are affine and wavelets, whereas Gabor signals are not wavelets. Affine wavelet signal representation is required under the present invention.

Relation of elementary signals to other time-frequency signals:

With n=0, the elementary signal is:

$$s(t)=(2/\Delta t^2)^{1/4} \exp\{-\pi[(t-t_0)/\Delta t]^2\} \times \exp\{i 2\pi f_0[t-t_0/2]\},$$

$$S(f)=(2/[2\Delta f^2])^{1/4} \exp\{-(1/\pi)[(f-f_0)/2\Delta f]^2\} \times \exp\{i 2\pi t_0[f-f_0/2]\}$$

A partial Fourier transform gives the Wigner distribution fuunction:

$$W(t,f)=2 \exp\{-2\pi[(t-t_0)/\Delta t]^2\} \times \exp\{-(1/2\pi)[(f-f_0)/2\Delta f]^2\}$$

In general, the elementary signals are:

$$s(t)=D_n(t) \cos[180t/\{\tfrac{1}{2}(2n+1)\}]^0, \ n=0,1,2,\ldots,$$

where the $D_n(t)$ are modified Weber-Hermite polynomials:

$$D_n(t)=\exp[(-\tfrac{1}{2}c)t^2]H_n(t), \ n=0,1,2,\ldots,$$

and the $H_n(t)$ are Hermite polynomials:

$$H_n(t)=(-1)^n \exp[t^2]\partial^n \exp[-t^2]/\partial t^n, \ n=0,1,2,\ldots$$

The general Wigner distribution representation is:

$$W(t,f)=2 \exp\{-2\pi\sigma)(t-t_0)^2\} \times \{-(\sigma/2\pi)(f-f_0)^2\},$$

where σ is defined as $\Delta t^2$, with the relation to $\Delta f^2$ defined by: $\Delta f \cdot \Delta t = \tfrac{1}{2}(2n+1), \ n=0,1,2,\ldots$ Derivation of primitives (elementary signals):

The wave equation for a confined oscillator is Weber's equation:

$$d^2D/dt^2+(\lambda-\xi^2)D=0,$$

where ξ is a dimensionless independent variable and λ is a dimensionless eigenvalue, the solutions for which are parabolic cylinder or Weber-Hermite functions:

$$D_n(t)=N_n H_n(\xi) \exp[-\xi^2], \text{ where}$$

$N_n$ is a constant such that:

$$\int_{-\infty}^{+\infty} D_n^*(t)D_n(t)dt = 0,$$

and $H_n(\xi)=(-1)^n \exp[\xi^2]\partial^n \exp[-\xi^2]/\partial t^n$ are Hermite polynomials.

Relationship of signals to system: an optimization example using dynamic trading:

If a system is assumed defined by: $\Delta F=10$ GHz, $F_0=40$ GHz;

$$F_0 T_0=\Delta F \Delta T=\Xi=(\tfrac{1}{2})(2N+1), \ N=0,1,2,\ldots,$$

and the signals defining the output of the system are defined by:

$$f_0 t_0=\Delta f \Delta t=\xi=(\tfrac{1}{2})(2n+1), \ n=0,1,2,\ldots;$$

then referring to Table 1: if $\Delta F=10$ GHz, then $\Delta T=1.05$ nanosec. at level N=10 and

TABLE 1

| $\Delta T \times 10 - 9$ sec. | number of signals discriminable | $\Xi$ | $\xi$ |
|---|---|---|---|
| 1.05 | 21 | 10.5 | 0.5 ← Δt < ΔT. |
| 0.95 | 6 | 9.5 | 1.5 ← Δt < ΔT. |
| 0.85 | 3 | 8.5 | 2.5 ← Δt < ΔT. |
| 0.75 | 2 | 7.5 | 3.5 ← Δt < ΔT. |
| 0.65 | 1 | 6.5 | 4.5 ← Δt < ΔT. |
| 0.55 | 1 | 5.5 | 5.5 ← Δt < ΔT. |

$\Xi=10.5$. At this level of system functioning, we assume that the input can be sampled at fine grain, i.e., n=0 and $\xi=0.5$. Therefore the input would yield the largest information content. If, now, the response time of the system, $\Delta T$, is shortened, then level N=1, $\Xi=0.95$ and $\Delta T=0.95$ nanosec.; in a compensatory fashion then input is sampled at a coarser grain resulting in n=1, $\xi=1.5$, yielding less information content. Shortening the response time of the system further results in a final reduction of $\Delta T$ and $\Xi$ to 0.55 nanosec. and 1, respectively, and in an increase of $\xi$ to 5.5. That is, $\Xi=\xi$ and the system and sampled-signal are in equilibrium. At equilibrium, there is no "gray scale" per sampling cycle, i.e., the gray scale sampling has been traded for system sampling speed (cf. FIGS. 5, 6, 7).

The four parameter elementary signals:

Both systems and sampled signals are completely defined by four signal parameters: all four parameters are interrelated by classical uncertainty relations, so that changing one parameter changes the other three. The four signal and system parameters are: $f_0$, $t_0$, $\Delta f$ and $\Delta t$ and $F_0$, $T_0$, $\Delta F$ and $\Delta T$ are related by the classical uncertainty relations:

$$f_0 t_0=\Delta f \Delta t=(\tfrac{1}{2})(2n+1), \ n=0,1,2,\ldots$$

$$F_0 T_0=\Delta F \Delta T=(\tfrac{1}{2})(2N+1), \ N=0,1,2,\ldots$$

that if one parameter is changed, all are changed commensurately:

$$f_0=4\Delta f; \ t_0=\Delta t/4;$$

$$F_0=4\Delta F; \ T_0=\Delta T/4.$$

If elementary signals are not used and only one parameter is changed, then side-lobes appear under transformation, i.e., discrimination capability (information) is lost.

The purpose of elementary signal analysis:

The purpose of elementary signal analysis is to provide a rational and optimum basis for the choice of the structure of the primary elements of analog information within the analog wave as received by, e.g., a sensor. Each elementary signal has an informational value of resolving one binary decision in transmission and digital processing.

Resolution limits of signal detectors:

Signal uncertainty product levels are controlled by the ability of a system to indicate changes in energy content. The resolution limit, $U=(\Delta E/E_0)(\Delta F/F_0)(\Delta T/T_0)$ is the volume of a region within which no change of state in the system may be observed.

U is irreducibly fixed by the limiting value of $\Delta E/E_0$.

Whereas the $\Delta F \Delta T$ product is freely deformable, no operations on either $\Delta F$ or $\Delta T$ can further the reduction of the energy resolution limit unless the controlling level, N, is changed.

The least changes any detector can indicate is determined by the smallest measurable change in energy storage or power flow. This is in accordance with the Boltzmann-Ehrenfest adiabatic principle: for a system excited by a change in parameters, the ratio of energy content to resonant frequency is a constant.

Relation of primitive (elementary) signals to ODEs defining a system:

Any system can be considered to be defined by ODEs. In order to provide context in explaining the present procedure, a representation ODE is chosen:

$$M[d^2x/dt^2]+D[dt/dx]+kx=0.$$

where M is a "mass" term, D is a "displacement" term and k is a coefficient of restitution. In this example, the system parameters, $\Delta F$, $\Delta T$, etc. will be used instead of the signal parameters, $\Delta f$, $\Delta t$, etc. (see FIG. 1.). The system parameters are then defined as:

$$Q_o = [\text{peak energy stored at the natural frequency}]/[\text{energy dissipated per cycle at the natural period}].$$

$$= (2\pi F_o M)/D = k/2\pi F_o D = \sqrt{(kM)/D} \approx F_o/\Delta F.$$

$\Delta E$=minimum change of energy detectable;
$E_0$=initial amount of energy stored in the detector system.
$\Delta E/E_0$=energy resolution limit.
$\alpha=-\ln[1-\{1-(\Delta E/E_0)\}]$, i.e., the energy content must change by an amount, $\exp[-\alpha]$, times its original value for the change to be at least equal to the minimum change discernible;
$T_0$=natural period of the system;
$\Delta T$=least interval during which the system is capable of changing its energy storage by the factor $\exp[-\alpha]$;
$\Delta T/T_0=\alpha Q_0/2\pi$=temporal resolution limit of the system;
$F_0=(1/2\pi)\sqrt{(k/M)}$=natural frequency of the system;
$\Delta F$=least frequency chage for which the system is capable of changing its energy storage by a factor $\exp[-\alpha]$;
$\Delta F/F_0=\sqrt{[\exp[-\alpha]-1]}/Q_0$=frequency resolution of the system The parameters of the system defined in terms of signal and noise are:
$\Delta E/E_0=N/(S+N)$;
$\Delta F/F_0=1/[Q_0\sqrt{(S/N)}]$
$\Delta T/T_0=[Q_0/2\pi]\ln[(S/N+1)/(S/N)]$
$U=[(S/N)^{-3/2}/2\pi].[\{-(S/N)/(1+S/N)/(1+S/N)\}]$
$\alpha=\ln[(S+N)/S]$
$\Delta F\Delta T=(1/2\pi)[\sqrt{(N/S)}].\ln[1+N/S]$.

The system dynamics are then described as follows:

The time required for a detector to build up to within a corresponding fraction of its steady-state value must not exceed the shortest time interval over which a significant fluctuation of power level occurs in the component of the signal being detected (FIG. 4).

The rate at which the indication can build up or decay in the detector must exceed a limiting value.

This rate is usually described by reference to the response time of the detector, i.e., the time required to reach substantially steady-state indication after an abrupt change in the signal (FIG. 2).

The ability to resolve a change in power levels limits the discrimination that can be achieved for changes in frequency or intervals of time. The transient error becomes a least volume in space within which no informatuon about the signal can be found.

The size of this least volume is limited by the natural behavior of the detector, but its shape can be distorted to suit special needs or contingencies.

In the case of passive/active systems: if faster dump/dwell/scan is required and bandwidth is variable, then the Q must be decreased, resulting in an increase in bandwidth (i.e., an increase in $\Delta F/F_0$).

In the case of passive/active systems: if faster dump/dwell/scan is required and bandwidth is fixed, (i.e., the system is of constant Q), then the volume representing the transient error must be increased (i.e., an increase in $\Delta E/E_0$) (FIG. 3).

An increase in $\Delta E/E_0$ or N, as defined by $F_0T_0=\Delta F\Delta T=(1/2)(2N=1)$, $N=0,1,2,3\ldots$ is compensated by a decrease in n as defined by $f_0t_0=\Delta f\Delta t=(1/2)(2n+1)$, $n=0,1,2,\ldots$ According to the present invention, a system/sampled-signal equilibrium must be retained for optimum performance. Therefore, an increase in N results in a decrease in n, which results in an increase in gray scale. Conversely, a decrease in N results in an increase in n, which results in a decrease in gray scale (cf FIG. 7).

Figure 5B:
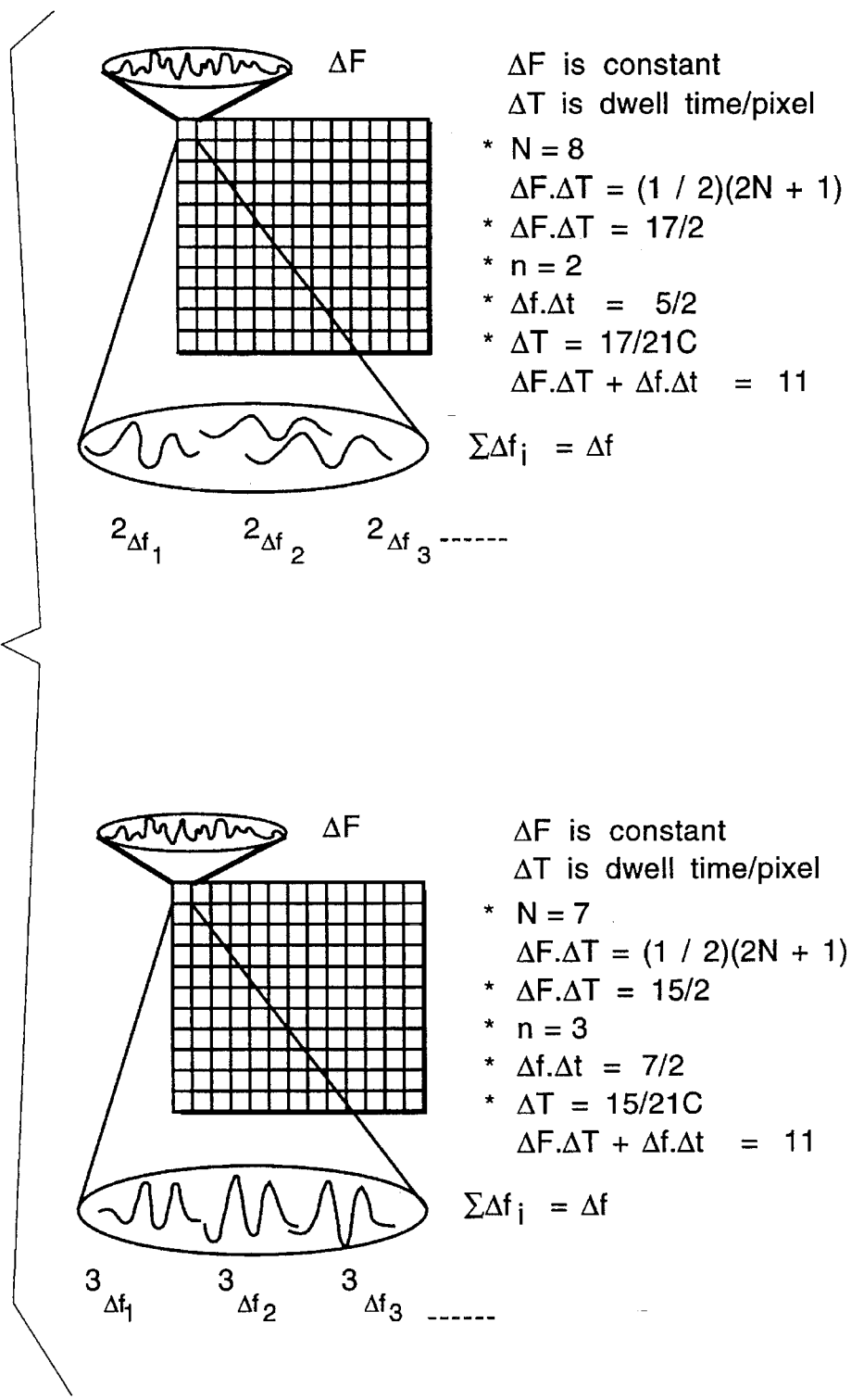

Two examples of dynamic equilibrium are shown in FIGS. 5. and 6.

If $\Delta T$ is the dump time (passive system), or dwell/scan time (active system), $F_0$ is the natural frequency of the system, then the system dynamic operates according to Table 2:

TABLE 2

| System | Type of Systems | |
|---|---|---|
| | k (scanning parameter) | $\Delta T$, the dwell/scan/dump time |
| 1. Passive: (dump time) dwell | 0 | $\alpha Q/2\pi F_0$ |
| 2. Active: uniform scan, dF/dt = k | $\Delta F/T$ | $\alpha T/2\pi(F_U - F_L)$ |
| 3. Active: log scan, dF/dT = kF$_0$ | $\ln(F_U/F_L)/T$ | $(\sqrt{F_0})^{-1}\sqrt{[\alpha T/(2\pi \ln(F_U/F_L)]}$ |
| 4. Active: quadratic scan, dF/dT = kF$_0^2$ | $(F_U^{-1} - F_L^{-1})/T$ | $(\sqrt{F_0})^{-1}\sqrt{[\alpha T/2\pi \ln(F_U^{-1} - F_L^{-1})]}$ |

Markov Statististics, Cellular Automata and Tracking:

The explicit determination of the evolution of a matrix during a lapse, t, requires information about initial data of "incoming data (matrices)" over a spatial interval with length 2t. We characterize time-independent Markov processes by a transition operator, $C^*_t$, acting on densities, $\rho(\omega)$, over G:

$$\rho_t(\omega)=C^*_t\rho_0(\omega).$$

The transition operators, $C^*_t$, for a Markov process form a semigroup:

$$C^*_0=1, C^*_t C^*_r=C^*_{t+r} \ (t\geq 0, r\geq 0).$$

A single invariant probability measure, $\rho_{eq}$, is defined:

$$C^*_t\rho_{eq}=\rho_{eq}.$$

Markovian processes contract the discrepancies between a nonequilibrium function, $\rho$, and the invariant equilibrium function, $\Sigma_{eq}$. The passage from a neural net architecture to a cellular automata architecture is the passage from a one-to-one dynamical system $(\Gamma, d\mu, N_t)$ to a Markov process $(\Gamma, d\mu, C_t)$.

An orthonormal basis for any distribution function can be defined:

$$\rho(\omega)=1+\Sigma_{ti}a_{ti}\phi_{ti}(\omega)$$

The $a_{ti}$ define the evolution to equilibrium of both neural net and cellular automata architectures. The evolution of the cellular automata is defined by:

$$C^*_t\rho=1+\Sigma_{ni}\{\lambda(t+n)/\lambda(n)\}a_{ni}\phi_{n+t,i},$$

where $$a_{ni}=\lambda(n)a_{ni}$$

The rate of change of the system is given by:

$$d(\omega,\omega')\approx\exp[-|n\sigma|]$$

where $\sigma$ is the average Liapounov exponent.

Lie group description of automata networks:

All automata networks can be given a Liapounov description:

$$du/dx=F(x,u),$$

i.e., a first order ordinary differential equation description. If they self-map, or provide an output, then the equation is invariant under a one-parameter, or many-parameter group of transformations. Therefore, there is a symmetry group description of that mapping. Simply stated: if automata networks provide a mapping, then there is a symmetry group description of that mapping.

The computational space is defined over a manifold (matrix), which is a space which locally functions as an open subset of some Euclidean space, but whose global character can be more complex (e.g., with fan-out and fan-in). A manifold is thus a phase space defined with respect to products of dimensions defining a phase space volume. This volume is the volume V of signal space and U of the system previously defined. In the case of one layer with local interconnects (Hopfield model) and with N cells, the energy is (Hopfield, 1984; Hopfield and Tank, 1986):

$$E=-(½)\Sigma_i\Sigma_j w_{ij}y_iy_j-\Sigma_j x_jy_j.$$

The outputs $y_i$ change with time according to a linear summation rule with a threshold. The $w_{ij}$ matrix describes the connection strength of each pair of cells with the number of connections of the order $N^2/2$. If the $w_{ij}$ matrix is symmetric, then the $y_i$'s change so as to decrease the value of E to a local minimum. $w_{ij}$ is also a covariance matrix. Therefore one cell of a layered network corresponds to a fully connected local single-layer network. The Hopfield model has fixed connection strengths. Therefore, E is minimal for a set of activities rather than a set of mature connection strengths as in the hierarchical or layered model. Each level output in a multiple-level network corresponds to each level of a series of a Weber-Hermite expansion of the energy of the total network. Each level output is the energy minimum for that level truncation of the expansion.

A symmetry group of a system is the largest group of transformations acting on the matrices of the system which transforms input to the system to output.

Nonlinear conditions of invariance of the system/network under group transformation can, in the case of a continuous group, be replaced by equivalent and simpler, linear conditions, demonstrating a form of 'infinitesimal' invariance of the network under the generators of the group.

Network recognition and tracking using preselected primitives (elementary signals) can be described as a process of solving a system of ODEs.

Invariance under a one-parameter symmetry group implies that the order of the matrix (network layer) can be reduced by one.

A network can be derived from a variational principle (Liapounov equation), either as the Euler-Lagrange equations of some functional, or as the Hamiltonian of the system.

An input vector field to the network is the infinitesimal generator of a symmetry group.

The process of prolonging group transformations includes not only the input (independent variables) and the output (dependent variables) but also the derivatives of the output variables (Liapounov exponents). Jet spaces represent these derivatives. Given a smooth function $u=f(x)$, so $f: X\rightarrow U$, there is an induced function $u^{(N)}=pr^{(N)}f(x)$ called the N-th prolongation of F. The operation of a network whereby $$U=(\Delta E_N/E_0)(\Delta F_N/F_0)(\Delta T_N/T_0), N=0,1,2,3,\ldots k,$$

with N progressing from, e.g., N=k through N=0, is the prolonging of the network mapping. Thus $pr^{(n)}f$ is a function from X to the space $U^{(N)}$, and for each x in X, $pr^{(N)}f$ is a vector whose entries represent the values of f and all of its derivatives up to order N at the point x. Therefore the N'th prolongation $pr^{(N)}f(x)$ represents the Weber-Hermite polynomial of degree n for f at the point x, since the derivatives of order $\leq n$ determine the Weber-Hermite polynomial and vice versa.

The processes of recognition and tracking are smooth network mappings $F: M\rightarrow N$, from an m-dimensional manifold (matrix), M, (the input), to an n-dimensional manifold (matrix), N, the output. The rank of F at a point $x\in M$ is the rank of the n×m Jacobian matrix $(\partial F_i/\partial x_j)$ at x.

The network mappings F can be parameterized into smooth mappings onto hidden layer matrices (submanifolds) O,P,Q ... e.g., $\phi: O\rightarrow N \subset M$. The dimensions of the hidden layers (submanifolds), O,P,Q ... are the same as that of N and do not exceed that of M.

The map $\phi$ is called an immersion and defines a parameterization of the hidden layer (submanifold) N. The training process in automata networks is a construction of an immersion process.

The recursive network's action towards a output is described by a curve, A, on a smooth manifold, M, which is a trajectory in phase space, and is parametrized by a smooth map, $\phi: I\rightarrow M$, where I is a subinterval. A is given by m smooth functions $\phi(\epsilon)=(\phi^1(\epsilon),\ldots,\phi^m(\epsilon))$ of the real variable ε. At each point $x=\phi(\epsilon)$ of C the curve has a tangent vector: $d\phi/d\epsilon=(d\phi^1/d\epsilon, \ldots, d\phi^m/d\epsilon)$.

Every local Lie group defining one layer of a network, e.g., the n-th layer, is locally isomorphic to a neighborhood of the identity of some global Lie group, defining another layer, e.g., the (n+1)-th. If $V_{0c}$ V is a local Lie group then there exists a global Lie group and a coordinate chart F: $U^* \to V^*$ where $U^*$ contains the identity element, such that $V^* \subset V_0$.

The collection of all tangent vectors to all possible curves passing through a given point x in M is called the tangent space M at x. The tangent vector defines the Liapounov exponents. The collection of all tangent spaces corresponding to all points x in M is called the tangent bundle of M.

If x is a vector field, the parametrized maximal integral curve passing through x in M is the flow generated by x.

The vector field is the infinitesimal of the action of the local nodal activity.

Lie algebra:

If G is a Lie group then the Lie algebra is a finite dimensional space formed by invariant vector fields of the Lie group which are invariant under multiplication. The Lie algebra, g, is the "infinitesimal generator" of G. All the information in the group G is contained in its Lie algebra. Therefore, complicated nonlinear conditions of invariance under a group action can be replaced by relatively simple linear infinitesimal conditions.

The Lie algebra, g, of a Lie group, G, is the vector space of all right-invariant vector fields on G. Alternatively, the Lie algebra, g, of G can be defined as the tangent space to G at the identity element.

The Lie algebra gl(n) of the general linear group GL(n) is the space of all n×n matrices with the Lie bracket defined by the matrix commutator: $[A,B] \equiv BA-AB$.

There are certain constants $c_{ij}^k$, $i,j,k=1, \ldots, r$, called the structure constants of g such that:

$$[q_i, q_j] = \Sigma_{k=1}^r c_{ij}^k q_k, \; i,j=1, \ldots, r,$$

where $q_1, \ldots, q_r$ are the basis of g.

The de Rham complex of the manifold (matrix) M is a sequence of vector spaces and linear maps between successive spaces, in which the kernel of one of the linear maps contains the image of the preceding map.

An automata network has learned the correct output to an applied input when a self-mapping is possible which preserves an invariant function. That is:

if G is a local group of transformations acting on a matrix (manifold) M, a network function F: $M \to N$, where N is another matrix (manifold), is a G-invariant function if, for all $x \in M$, and all $g \in G$, g.x is defined:

$F(g.x)=F(x)$

The symmetry group of the output set $S_F=\{F(x)=0\}$ of a network is, in general, larger than the symmetry group of the function F (input) determining it.

Relation of group-invariance symmetry and networks:

Outputs which are invariant under a given r-parameter symmetry group of a system can be found by a network involving r fewer independent variables than the original input.

A quotient manifold is the resultant matrix from a fan-out or fan-in. Each nodal point on a quotient manifold corresponds to an orbit of the group, which results from a higher level fan out, or vectorial components of the inner product, so the quotient manifold (inner product) has, essentially, r fewer dimensions, where r is the number of parameters in the group. Group-invariant objects in the original manifold (at the lower level) will have natural counterparts on the quotient manifold (higher level) which serve to completely characterize them. In particular, a matrix which is invariant under the given transformation group will have a corresponding reduced subsystem of matrices on the quotient manifold (higher level), the number of independent variables having been reduced by r.

The reduced matrix set for the group-invariant output is the quotient manifold (at the higher level). If G is a local group of transformations acting on a smooth manifold (matrix) M and if M/G is the set of equivalence classes, or the set of orbits of G, then the projection $\Psi$: $M \to M/G$ associates to each x in M its equivalence class $\Psi(x) \in M/G$, which can be identified with the orbit of G passing through x. Any object on M which is invariant under the action of G will have a counterpart on the lower-dimensional quotient manifold M/G.

In general, if the matrix input, x, is defined over an open subset $M \subset X \times U$ of the space of independent and dependent variables upon which the symmetry group G acts regularly, then the reduced matrix x/G for the G-invariant solutions will be expressed as the quotient manifold M/G.

The experimental accessibility of Liapounov exponents and related quantities:

If r is ergodic then the ergodic theorem asserts that for every continuous function, $\phi$:

$$\lim_{T \to \infty}(1/T) \int_0^T \phi[f^t x(0)]dt = \int \rho(dx)\phi(x),$$

for almost all initial conditions and:

$$\rho(\phi) = \lim_{T \to \infty}(1/T) \int_0^T dt \phi[x(t)]$$

with m variables, i.e., $x \in R^m$, the derivative (d/dx)f can be replaced by the Jacobian matrix, evaluated at x: $D_x f=(\partial f_i/\partial x_j)$, then:

$$\lambda = \lim_{N \to \infty}(1/N) \log |D_{x(0)} f T_{\delta x}|,$$

which is the average rate of growth. For the continuous case it is:

$$\lambda(x, \delta x) = \lim_{T \to \infty}(1/T) \log |D_x f T_{\delta x}|.$$

If $T^t_x$ denotes the state at time t of the dynamical system which at time 0 was at x, then there is a smooth flow:

$$T^{t+s} = T^t T^s.$$

The tangent space at $x_1$ is mapped onto the tangent space at $x_2$ by the differential $(dT^t)_x$, the linear part of the nonlinear map $T^t$.

If $\xi$ is a nonzero vector in the tangent space at x, then the coefficients of expansion are obtained from (Oseledec's theorem (Oseledec, 1968)):

$$\lambda_t(x) = |dT^t_x \xi|/|\xi|$$

The rate of growth of an m-volume element is the rate of growth of the Jacobian matrix $|J_x^t| = |\det[(\partial f_i^t/\partial x_j)]|$ and is given by $$\lambda_1 + \ldots + \lambda_m.$$

For a map, f, with constant Jacobian, J, then:

$$\lambda_1+\ldots+\lambda_m=\log |J|$$

Example: the Hénon map (FIG. 22): J=−0.03, hence $\lambda_2=\log|J|-\lambda_1\approx-1.20-0.43=-1.62$.

Example: the Lorenz equation (FIG. 23): dJ′/dt=−((σ+1+b).
Therefore if $\lambda_1>0$, then all characteristic exponents are known, since $\lambda_2=0$ and $\lambda_3=-((\sigma+1+b)-\lambda_1)$.

The characteristic exponents measure the exponential separation of trajectories in time and are computed from the derivative $D_x f'$.

Let $T(x)=D_x f'$ and $T_x^n=T(f^{n-1}x)\ldots T(fx)T(x)$, then the largest exponent is given by:

$$\lambda_1=\lim_{n\to\infty}(1/n)\log |T_x^n u|,$$

where u(1), u(2), ..., are measurements regularly spaced in time. The other characteristic exponents can be obtained by diagonalizing the positive matrices $(T_x^n)^*T_x^n$ and using the fact that their eigenvalues behave like $\exp[2n\lambda_1]$, $\exp[2n\lambda_2]$, ... A simple method for a continuous-time dynamical system is to estimate the deviation of nearby trajectories from x(0). This yields $\lambda_1$. Then $\lambda_1+\lambda_2$ is the rate of growth of surface elements; $\lambda_1+\lambda_2+\lambda_3$ is the rate of growth of three volume elements, etc.

Liouville equation or L operator, describes the temporal evolution of an ideal neural network architecture.

An information producing operator, M, describes the temporal evolution of an ideal cellular automata network.

All automata network architectures (whether of NN, CA or hybrid type) are described by the commutation relations of their underlying algebra (Table 3):

$$[L,M]=LM-ML,$$

where

[L,M]=0 (ideal neural net architecture)

i[L,M]=KI (ideal cellular automata architecture).

TABLE 3

|  | Ideal Neural Net | Ideal Cellular Automata |
|---|---|---|
| Reversible? | Yes | No |
| Liouville's theorem applies? | Yes | No |
| Boltzmann's H-theorem constant in time? | Yes | No |
| System algorithmically integrable? | Yes | No |

Automata networks—Lie group description:

A manifold is (i) a space which appears to be a Euclidean subset but whose global characteris different (e.g., may have fan-in and fan-out); (ii) a phase space defined with respect to products of dimensions defining a phase space volume V.

A symmetry group transforms solutions of the system to other solutions.

Primitives permit nonlinear conditions of invariance of the system to be replaced by linear conditions.

A system of o.d.e.'s describing the symmetry group transformations can be described from a variational principle (e.g., Liapounov equation) either as the Euler-Lagrange equations of a functional, or as the Hamiltonian of the system.

A vector field is the infinitesimal generator of the symmetry group.

Prolonging group transformations expands the evolution of the system into polynomials giving derivatives (Liapounov exponents).

Jet spaces represent those derivatives.

Parameterization—a mapping can be parameterized into smooth mappings on manifolds.

Immersion—a parameterization of submanifolds.

Local-global connections—every local Lie group is locally isomorphic to a neighborhood of the identity of some global Lie group.

The action is obtained from the vector field (infinitesimal generator).

The Lie algebra has a matrix commutator:

$$[A,B]=BA-AB$$

Structure constants define Lie algebra from which Kolmogorov entropy can be obtained.

FIG. 26 shows that the procedures involve:

1) Refers to taking the physical machine/process/apparatus/network as given and may be a member of a large class of physical apparati or systems or networks.

2) Refers to describing that physical process in mathematical terms such as ODES, matrices, etc. Liapounov exponents are also extracted. Such exponents only can be extracted in the case of a system with explicit or implicit feedback. (Liapounov exponents are not functions or transforms). Therefore this procedure is not a blind mathematical procedure but can only be applied to the class of systems with explicit or implicit feedback.

3) Refers to a procedure whereby on the basis of knowledge obtained from the physical system in stages #1 and #2, a figure-of-merit (FOM) can be constructed based on (i) the descriptions of the sensory/data input to the physical system, (ii) the descriptions of the physical system itself, and (iii) the requirements of the user. The FOM is thus this the major design criterion for either an apparatus application-specific integrated circuit (ASIC), or an apparatus application-specific algorithm (ASA), either of which optimally control and reconfigure the specific physical machine/process/apparatus referenced in 1). The main function of ASIC/ASA is not to provide numbers but to provide real-time control of the machine/process/apparatus/network. This ongoing control can, of course, be tapped into, and an ongoing number stream can be obtained as the machine/process/apparatus functions optimally. But this is only a byproduct and not a complete or even necessary description. The focus of the invention is in the real-time, continuous and changing, optimum control, not numbers.

4) Refers to the ongoing, real-time control of the physical machine/process/apparatus/network in accordance with the ASIC/ASA constructed according to 1)–3). The ASIC/ASA is application-specific and machine/process/apparatus specific.

It can be seen that process step 3) is an emergent property from the given physical apparatus 1) and the procedures 2). The process 3) is both application-specific and apparatus-specific.

Application areas of the present invention:

As the present invention is a method and system, embodiments of the invention can be in either software or hardware form. The estimation by a control system acting on the network of the Liapounov exponents "on the fly" and before the action—computational operation or training operation—is completed, is an ideal task for a digital parallel processing supercomputer architecture. Furthermore, the use of this iterative control in Navier-Stokes equation calculations could lead to increases in speed. Dedicated or application specific, low cost integrated circuit or electronic chip (ASIC) embodiments are also possible.

The principles of the present invention can be applied to many systems already existing. "Elastic engineering", optimum graceful degradation, "Zoom" lensing and clutter control can all be applied to existing systems. The methods of this invention can be applied to many already existing systems to permit extremes of performance and compensating with the minimum of tradeoff (minimum performance penalty) for those performance extremes. These principles also permit the perfection and refinement of neural nets and cellular automata by providing a control over, and correction for, the three greatest drawbacks of these processor designs to enable the setting of (1) time to closure, (2) an attractor other than a chaotic attractor, and (3) clutter control.

The invention also has smart weapons applications. For example, an air-to-air missile when first launched needs to be in the recognition and detection mode, which is a mode of functioning optimally performed by a neural net architecture. However, after recognition and detection has been performed, the missile needs to be in the track mode, which is a mode of functioning optimally performed by a cellular automata architecture. Under principles of this invention, architecture would thus reconfigure after recognition occurred. Kill assessment is also optimally performed with the cellular automata architecture, but if the missile overshoots, then the invention would reconfigure back to the neural net architecture in order to re-recognize a target.

The invention has numerous commercial application in civil aviation and many tasks involving machine (robotic) recognition and prediction. For example, under extreme conditions, e.g., in the case of an airplane affected by wind shear, the limiting bounds on controls might be exceeded in order for the plane to survive. That is, in this particular extreme situation, it may be of less consequence that the plane's structure is stressed—overstressed with respect to normal flying conditions—in order that a more important performance capability be achieved: the plane's survival. Thus, using principles and techniques disclosed herein, speed of response will be gained and compensated for in terms of overstress—but the absolute minimum of such overstress. High mobility fighter flight controls can also be designed on principles incorporating the invention.

References

Abarbanel, H. D. O., Brown, R. & Kennel, M. B., Variation of Lyapunov exponents on a strange attractor, manuscript.

Abarbanel, H. D. O., Brown, R. & Kennel, M. B., Lyapunov exponents in chaotic systems: their importance and their evaluation using observed data, manuscript.

Aliaga, J., Otero, D., Plastino, A. & Proto, A. N., Constants of motion, accessible states, and information theory. *Phys. Rev.* A35, 2304–2313, 1987.

Aliaga, J., Otero, D., Plastino, A. & Proto, A. N., Quantum thermodynamics and information theory. *Phys. Rev.*, 38, 918–928, 1988.

Atmanspacher, H. & Scheingraber, H., A fundamental link between system theory and statistical mechanics. *Foundations of Physics* 17, 939–963, 1987.

Barrett, T. W., The information content of an electromagnetic field with relevance to sensory processing of information. *T.I.T. J. Life Sciences* 1, 129–135, 1971.

Barrett, T. W., On vibrating strings and information theory. *J. Sound & Vibration* 20, 407–412, 1972.

Barrett, T. W., Conservation of Information. *Acustica* 27, 44–47, 1972.

Barrett, T. W., Definition precedence of signal parameters: sequential versus simultaneous information. *Acustica* 27, 90–93, 1972.

Barrett, T. W., The conceptual basis for two information theories—a reply to some criticisms. *J. Sound & Vbration* 25, 638–642, 1972.

Barrett, T. W., Analytical information theory. *Acustica* 29, 65–67, 1973.

Barrett, T. W., Structural information theory. *J. Acoust. Soc. Am.*, 54, 1092–1098, 1973.

Barrett, T. W., Structural information theory based on electronic configurations. *T.I.T. J. Life Sciences* 5, 29–42, 1975.

Barrett, T. W., Nonlinear analysis and structural information theory: a comparison of mathematical and physical derivations. *Acustica* 33, 149–165, 1975.

Barrett, T. W., On linearizing nonlinear systems. *J. Sound & Vibration* 39, 265–268, 1975.

Barrett, T. W., Linearity in secular systems: four parameter superposition. *J. Sound & Vibration* 41, 259–261, 1975.

Barrett, T. W., Information measurement I. On maximum entropy conditions applied to elementary signals. *Acustica* 35, 80–85, 1976.

Barrett, T. W., Information measurement II. On minimum conditions of energy order applied to elementary signals. *Acustica* 36, 282–286, 1976.

Barrett, T. W., Structural information theory of sound. *Acustica* 36, 272–281, 1976.

Barrett, T. W., Cochlear fluid mechanics considered as flows on a cusp catastrophe. *Acustica* 38, 118–123, 1977.

Barrett, T. W., A mathematical theory of cochlear fluid mechanics: a kinetic theory of nonequilibrium flows and of energy absorption and dispersion in the cochlear fluid-partition system. pp. 39–84 in W. A. Gruver (ed) *Simulation and Identification in Biological Science,* Academic Press, New York, 1977.

Barrett, T. W., Quantum statistical foundations for structural information theory and communication theory. pp. 391–409 in V. Lakshmikantham (ed) *Nonlinear Systems and Applications: an International Conference,* Academic Press, New York, 1977.

Barrett, T. W., The cochlea as Laplace analyzer for optimum (elementary) signals. *Acustica* 39, 155–172, 1978.

Barrett, T. W., The transfer function of the cochlea. *Quart. Rev. Biophysics* 11, 1–38, 1978.

Barrett, T. W., Cochlear fluid mechanics. In J. D. Schneck (ed) *First Mid-Atlantic Conference on Bio-Fluid Mechanics,* Proceedings of a conference held at Virginia Polytechnic Institute and State University, Blacksburg, Va., Aug. 9–11, 1978.

Barrett, T. W., Signal analysis by Hopf bifurcation in cochlear fluid mechanics. *Conf. IEEE/EMBS* (1979), *Frontiers of Engineering in Health Care,* Publishing Services, IEEE, New York, 1979.

Barrett, T. W., Signal analysis by elementary signals in cochlear fluid mechanics explained in terms of statistical hydromechanics and functional calculus. *Conf. IEEE/EMB* (1980), *Frontiers of Engineering in Health Care,* Publishing Services, IEEE, New York, 1980.

Barrett, T. W., The conceptual basis for the design of an auditory prosthetic device. *Acustica* 52, 148–159, 1983.

Bekenstein, J. D., Communication and energy. *Phys. Rev.,* A37, 3437–3449, 1988.

Brown, R., Bryant, P. & Abarbanel, H. D. I., Computing the Lyapunov spectrum of a dynamical system from observed time series, manuscript. UC San Diego, Scripps.

Bryant, P., Brown, R. & Abarbanel, H. D. I., Lyapunov exponents from observed time series. *Phys. Rev. Lett.,* 65, 1523–1526, 1990.

Chakrabarti, C. G., On non-equilibrium entropy and irreversibility. *Bull. Cal. Math. Soc.,* 79, 293–297, 1987.

Cleary, P. W., Lyapunov exponents as a measure of the size of chaotic regions, manuscript, Monash University.

Cuerno, R., Rañada, A. F., & Ruiz-Lorenzo, J. J., Deterministic chaos in the elastic pendulum: a simple laboratory for nonlinear dynamics, *Am. J. Phys.*, 60, 73–79, 1992.

De Souza, S., Rollins, R. W., Jacobs, D. T. & Hartman, J. L., Studying chaotic systems using microcomputer simulations and Lyapunov exponents. *Am. J. Phys.*, 58, 321–329, 1990.

Duering, E., Otero, D., Plastino, A. & Proto, A. N., Information theory and Riemann spaces: an invariant reformulation. *Phys. Rev.*, A32, 2455–2461, 1985.

Duering, E., Otero, D., Plastino, A. & Proto, A. N., General dynamical invariants for time-dependent Hamiltonians. *Phys. Rev.*, A35, 2314–22320, 1987.

Eckmann, J. P. & Ruelle, D., Ergodic theory of chaos and strange attractors. *Rev. Mod. Phys.*, 57, 617–656, 1985.

Eschenazi, E., Solari, H. G. & Gilmore, R., Basins of attraction in driven dynamical systems. *Phys. Rev.*, A39, 1989.

Farmer, J. D., Ott, E. & Yorke, J. A., The dimension of chaotic attractors. *Physica* 7D, 153–180, 1983.

Fox, R. F., Chaos, molecular fluctuations and the correspondence limit, manuscript, Georgia Institute of Technology.

Frederickson, P., Kaplan, J. L., Yorke, E. D. & Yorke, J. A., The Liapunov dimension of strange attractors. *J. Differential Equations* 49, 185–207, 1983.

Grassberger, P., Information aspects of strange attractors. pp. 193–222 in J. R. Buchler, J. M. Perdang & E. A. Spiegel (eds) *Chaos in Astrophysics*, D. Reidel, Dordrecht, 1985.

Grebogi, C., Ott, E. and Yorke, J. A., Chaos, strange attractors, and fractal basin boundaries in nonlinear dynamics, *Science* 238, 632–638, 1987.

Holzfuss, J. & Lauterborn, W., Liapunov exponents from a time series of achoustic chaos. *Phys. Rev. A* 39, 2146–2152, 1989.

Hopfield, J. J. Neurons with graded response have collective computational properties like those of two-state neurons. *Proc. Natl. Acad. Sci.*, 81, 3088–3092, 1984.

Hopfield, J. J. & Tank, D. W., Computing with neural circuits: a model. *Science* 233, 625–633, 1986.

Kawabe, T. and Ohta, S., Onset of chaos in time-dependent spherically symmetric SU(2) Yang-Mills theory, *Phys. Rev.* D41, 1983–1988, 1990.

Kinzel, W., Physics of neural networks. *Europhys. News*, 21,108–110, 1990.

Lau, C., *Neural Networks*, IEEE Press, Piscataway, N.J., 1991.

Mackay, R. S., Meiss, J. D. & Percival, I. C., Transport in Hamiltonian systems. *Physica* 13D, 55–81, 1984.

Meiss, J. D. and Ott, E., Markov tree model of transport in area-preserving maps, *Physica*, 20D, 387–402, 1986.

Misawa, T. & Yasue, K., Canonical stochastic dynamical systems. *J. Math. Phys.*, 28, 2569–2573, 1987.

Nagata, S., Sekiguchi, M. & Asakawa, K., Mobile robot control by a structures hierarchical neural network. *IEEE Control Systems Magazine*, April, 69–76, 1990.

Narendra, K. S., Ortega, R. and Dorato, P., *Advances in adaptive control*, IEEE Press, New York, 1991.

Nicolis, G. & Nicolis, C., Master-equation approach to deterministic chaos. *Phys. Rev.*, A38, 427–433, 1988.

Olver, P. J., *Applications of Lie groups to differential equations*, Springer, New York, 1986.

Oseledec, V. I., A multiplicative ergodic theorem. Liapunov characteristic numbers from dynamicals systems. *Trudy Moskov. Mat. Obsc.*, 19, 197–231, 1968.

Otero, D., Plastino, A., Proto, A. N. & S. Mizrahi, Relevant spaces in quantum dynamics and statistical physics. *Phys. Rev.*, A33, 3446–3450, 1986.

Otero, D., Plastino, A., Proto, A. N. & Zannoli, G., Ehrenfest theorem and information theory. *Phys. Rev.*, A26, 1209–1217, 1982.

Ott, E., Sauer, T. & Yorke, J. A., Lyapunov partition functions for the dimensions of chaotic sets. *Phys. Rev.*, A 39, 1989.

Posh, H. A. and Hoover, W. G., Equilibrium and nonequilibrium Lyapunov spectra for dense fluids and solids. *Phys. Rev.*, A39, 2175–2188, 1989.

Preston, K. and Duff, M. J. B., *Modern cellular automata*, Plenum, New York, 1984.

Proto, A. N., Aliaga, J., Napoli, D. R., Otero, D. & Plastino, A., Dissipative evolution, initial conditions, and information theory. *Phys. Rev.*, A39, 1989.

Riedel, U., Kühn, R. & van Hemmen, J. L., Temporal sequences and chaos in neural nets. *Phys. Rev.*, A38, 1105–1108, 1988.

Sánchez-Sinencio, E. & Lau, C., *Artificial Neural Networks*, Piscataway, N.J., 1992.

Schürmann, B., Stability and adaptation in artificial neural systems. *Phys. Rev.*, A40, 2681–2688, 1989.

Sorenson, H. W., *Kalman filtering: theory and application*, IEEE, New York, 1985.

Toffoli, T. & Margulis, N., *Cellular Automata Machines*, MIT Press, 1987.

Wolf, A., Swift, J. B., Swinney, H. L. & Vastano, J. A., Determining Lyapunov exponents from a time series. *Physica* 16D, 285–317, 1985.

Wolfram, S., *Theory and applications of cellular automata*, World Scientific, Singapore, 1986.

Wolfram, S., Statistical mechanics of cellular automata. *Rev. Mod. Phys.*, 55, 601–644, 1983.

Yasue, K., Jibu, M., Misawa, T. & Zambrini, J.-C., Stochastic neurodynamics. *Ann. Inst. Stat. Math.*, 40, 41–59, 1988.

Zeng, X., Eykholt, R. and Pielke, R. A., Estimating the Lyapunov-exponent spectrum from short time series of low precision, *Phys. Rev. Lett.*, 25, 3229–3232, 1991.

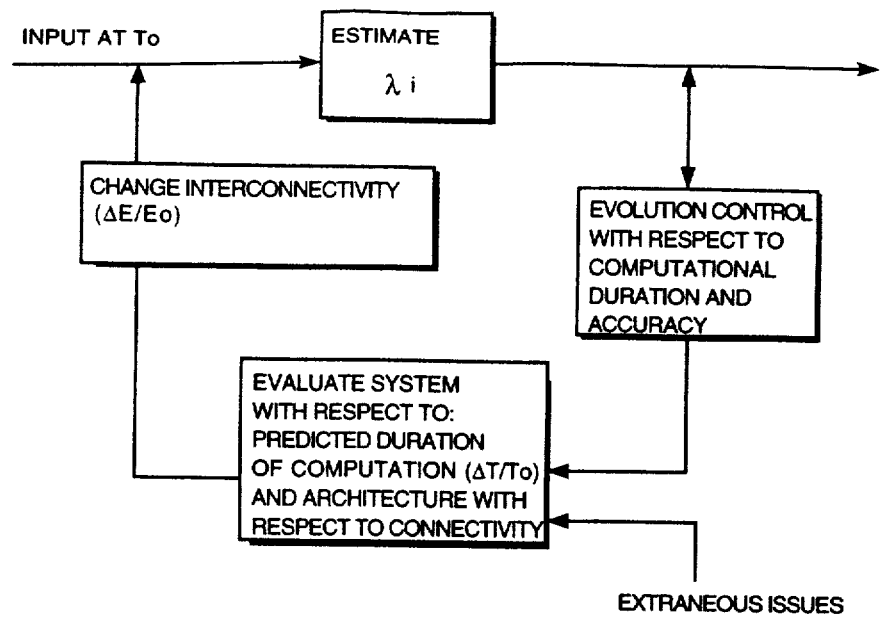
FIG. 21
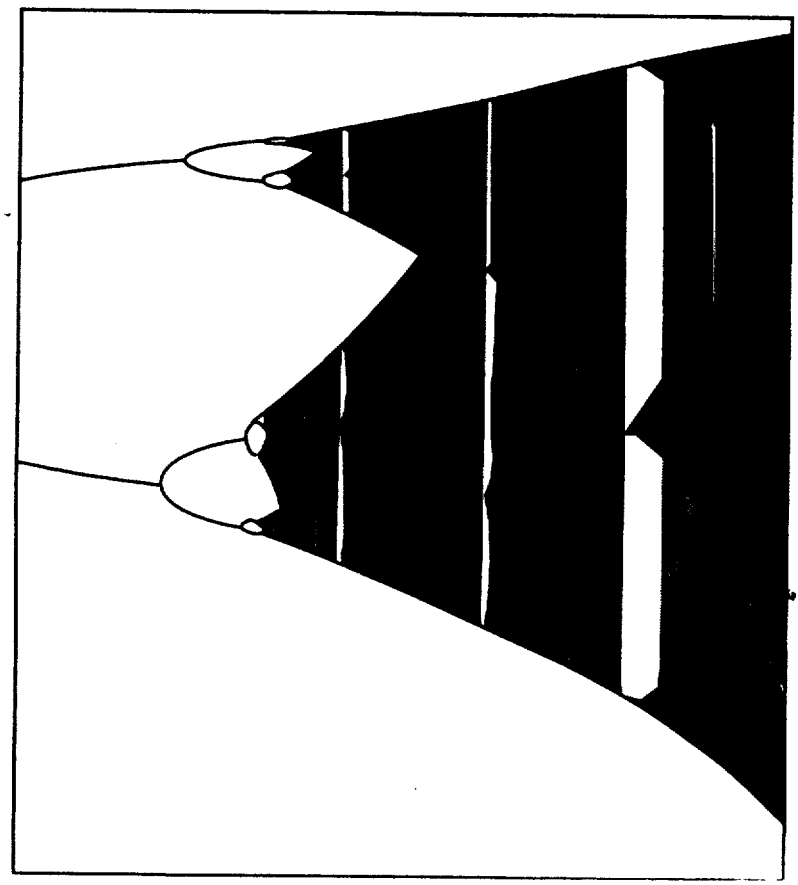

What is claimed is:

1. A method for obtaining optimum performance and optimum degradation from Lie algebra descriptions of a spectrum of reconfigurable network architectures, including, neural nets and cellular automata comprised of interconnected nodes having dynamic performance characteristics of a computational process, comprising:

monitoring the dynamic performance of the computational process by continued extraction of Liapounov exponent indicators, and reconfiguring said reconfigurable network architecture when said Liapounov exponent indicators predict non-optimum performance.

2. The method defined in claim 1, comprising making compensatory adjustments of signal sampling performance and operating system performance of said reconfigurable network architecture.

3. The method defined in claim 1 or claim 2, comprising:

optimizing said reconfigurable network architecture to the computational process by reconfiguration of nodal capabilities and degree of interconnectedness between nodes to obtain a Lie algebra description architectural form between ideal neural net with maximum interconnectedness and ideal cellular automata with maximum nodal capability.

4. A method for obtaining optimum performance and optimum degradation from Lie algebra descriptions of a spectrum of reconfigurable network architectures, including, neural nets and cellular automata comprised of interconnected nodes having dynamic performance characteristics of a computational process, comprising:

monitoring the dynamic performance characteristic of the computational process by continued extraction of Liapounov exponent indicators, reconfiguring said reconfigurable network architecture when said Liapounov exponent indicators predict non-optimum performance, making compensatory adjustments of signal sampling performance and operating system performance of said reconfigurable network architecture, and optimizing said reconfigurable network architecture to the computational process by reconfiguration of nodal capabilities and degree of interconnectedness between nodes to obtain a Lie algebra description architectural form between ideal neural net with maximum interconnectedness and ideal cellular automata with maximum nodal capability.

5. A system for obtaining optimum performance and optimum degradation from a Lie algebra descriptions of a spectrum of reconfigurable network architectures, including, neural nets and cellular automata comprised of interconnected nodes having dynamic performance characteristics of a computational process, comprising:

means for monitoring the dynamic performance of the computational process by continued extraction of Liapounov exponent indicators, and means for reconfiguring said reconfigurable network architecture when said Liapounov exponent indicators predict non-optimum performance.

6. The system defined in claim 5 comprising means for making compensatory adjustments of the operating system performance of said reconfigurable network architecture.

7. The system defined in claim 5 or claim 6, comprising:

means for optimizing said reconfigurable network architecture to the computational process by reconfiguration of nodal capabilities and degree of interconnectedness between nodes to obtain a Lie algebra description architectural form between ideal neural net with maximum interconnectedness and ideal cellular automata with maximum nodal capability.

8. A system for obtaining optimum performance and optimum degradation from Lie algebra description of a spectrum of reconfigurable network architectures, including, neural nets and cellular automata comprised of interconnected nodes having dynamic performance characteristics of a computational process, comprising:

means for monitoring the dynamic performance of the computational process by continued extraction of Liapounov exponent indicators, means for reconfiguring said reconfigurable network architecture when said Liapounov indicators predict non-optimum performance, means making compensatory adjustments of operating system performance of said reconfigurable network architecture, and means for optimizing said reconfigurable network architecture to the computational task by reconfiguration of nodal capabilities and degree of interconnectedness between nodes to obtain a Lie algebra description architectural form between ideal neural net with maximum interconnectedness and ideal cellular automata with maximum nodal capability.

\* \* \* \* \*

UNITED STATES PATENT AND TRADEMARK OFFICE
CERTIFICATE OF CORRECTION

PATENT NO. : 5,602,964     Page 1 of 2
DATED : Feb. 11, 1997
INVENTOR(S) : Terence W. BARRETT It is certified that error appears in the above-indentified patent and that said Letters Patent is hereby corrected as shown below:

In the drawings:

Sheet 15 (Figs. 13A, 13B, 13C and 13D) should be deleted to appear as per attached sheet 15, consisting of Figs. 21 and 24.

In the Assignee:

No information should be contained in the Assignee line. There is no Assignee.

Signed and Sealed this

Second Day of December,1997

Attest:

BRUCE LEHMAN

Attesting Officer      Commissioner of Patents and Trademarks